(12) United States Patent
Fukushima et al.

(10) Patent No.: US 11,209,575 B2
(45) Date of Patent: Dec. 28, 2021

(54) LAMINATE, ANTIREFLECTION PRODUCT, AND MANUFACTURING METHOD THEREOF

(71) Applicant: FUJIFILM Corporation, Tokyo (JP)

(72) Inventors: Yuta Fukushima, Kanagawa (JP); Shuntaro Ibuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 176 days.

(21) Appl. No.: 16/265,114

(22) Filed: Feb. 1, 2019

(65) Prior Publication Data

US 2019/0162878 A1 May 30, 2019

Related U.S. Application Data

(63) Continuation of application No. PCT/JP2017/027752, filed on Jul. 31, 2017.

(30) Foreign Application Priority Data

Aug. 2, 2016 (JP) .............................. JP2016-152256

(51) Int. Cl.
| | | |
|---|---|---|
| *G02B 1/118* | (2015.01) | |
| *B32B 5/16* | (2006.01) | |
| *B32B 7/12* | (2006.01) | |
| *C03C 17/32* | (2006.01) | |
| *C03C 17/42* | (2006.01) | |
| *G02B 1/113* | (2015.01) | |
| *B32B 17/10* | (2006.01) | |
| *B32B 27/14* | (2006.01) | |

(52) U.S. Cl.
CPC ............... *G02B 1/118* (2013.01); *B32B 5/16* (2013.01); *B32B 7/12* (2013.01); *B32B 17/10018* (2013.01); *B32B 27/14* (2013.01); *B32B 2264/102* (2013.01)

(58) Field of Classification Search
None
See application file for complete search history.

(56) References Cited

U.S. PATENT DOCUMENTS

| | | | |
|---|---|---|---|
| 2003/0178221 A1* | 9/2003 | Chiu ..................... | H05K 3/323 174/117 F |
| 2011/0267698 A1 | 11/2011 | Guilfoyle et al. | |
| 2012/0134024 A1 | 5/2012 | Lander et al. | |
| 2012/0281292 A1 | 11/2012 | Baca et al. | |
| 2013/0107370 A1 | 5/2013 | Lander et al. | |
| 2013/0115441 A1 | 5/2013 | Bookbinder et al. | |
| 2013/0323468 A1 | 12/2013 | Myers et al. | |
| 2014/0342121 A1 | 11/2014 | Taguchi et al. | |
| 2015/0062713 A1 | 3/2015 | Hart et al. | |
| 2015/0064405 A1 | 3/2015 | Koch, III et al. | |
| 2015/0175478 A1 | 6/2015 | Ravichandran et al. | |
| 2015/0198752 A1 | 7/2015 | Lander et al. | |
| 2015/0276991 A1 | 10/2015 | Uchimura et al. | |
| 2015/0299035 A1 | 10/2015 | Kuksenkov | |
| 2016/0077239 A1 | 3/2016 | Asahi et al. | |
| 2016/0077240 A1* | 3/2016 | Asahi ................... | G02B 5/0294 428/331 |
| 2016/0355689 A1 | 12/2016 | Lander et al. | |
| 2017/0015087 A1 | 1/2017 | Asahi et al. | |

FOREIGN PATENT DOCUMENTS

| | | | |
|---|---|---|---|
| JP | H05-013021 A | 1/1993 | |
| JP | 2002-234754 A | 8/2002 | |
| JP | 2009-139796 A | 6/2009 | |
| JP | 2010-091604 A | 4/2010 | |
| JP | 2010-107858 A | 5/2010 | |
| JP | 2014-520056 A | 8/2014 | |
| JP | 2014240956 A * | 12/2014 | ............... B32B 7/02 |
| JP | 2015-197540 A | 11/2015 | |
| JP | 2015-200880 A | 11/2015 | |
| JP | 2016-071133 A | 5/2016 | |
| WO | 2013/081145 A1 | 6/2013 | |

OTHER PUBLICATIONS

International Search Report issued in PCT/JP2017/027752 dated Oct. 24, 2017.
Written Opinion issued in PCT/JP2017/027752 dated Oct. 24, 2017.
International Preliminary Report on Patentability completed by WIPO dated Feb. 5, 2019, in connection with International Patent Application No. PCT/JP2017/027752.
Office Action, issued by the Japanese Patent Office dated Sep. 3, 2019, in connection with Japanese Patent Application No. 2018-531892.
Office Action, issued by the Japanese Patent Office dated Dec. 3, 2019, in connection with Japanese Patent Application No. 2018-531892.

\* cited by examiner

*Primary Examiner* — Cheng Yuan Huang
(74) *Attorney, Agent, or Firm* — Edwards Neils LLC; Jean C. Edwards, Esq.

(57) ABSTRACT

Provided are a laminate including: a glass substrate; a layer (ca) including a binder; a particle (a2) having an average primary particle diameter of 100 nm to 380 nm; and a layer (b) including a pressure sensitive adhesive, in which the layer (ca) is present on a side closer to the glass substrate than the layer (b), and the particle (a2) is buried in layers obtained by combining the layer (ca) and the layer (b) and protrudes from an interface of the layer (ca) on a side opposite to an interface of the layer (ca) on the glass substrate side, an antireflection product using the laminate, and a method of manufacturing the laminate and an antireflection product.

5 Claims, 1 Drawing Sheet

LAMINATE, ANTIREFLECTION PRODUCT, AND MANUFACTURING METHOD THEREOF

CROSS-REFERENCE TO RELATED APPLICATIONS

This is a continuation of International Application No. PCT/JP2017/27752 filed on Jul. 31, 2017, which was published under Article 21(2) in Japanese, and which claims priority under 35 U.S.C.§ 119(a) from Japanese Patent Application No. 2016-152256 filed on Aug. 2, 2016. The above applications are hereby expressly incorporated by reference, in their entirety, into the present application.

BACKGROUND OF THE INVENTION

1. Field of the Invention

The present invention relates to a laminate, an antireflection product, and a manufacturing method thereof.

2. Description of the Related Art

In an image display device such as a display device using a cathode ray tube (CRT), a plasma display panel (PDP), an electroluminescent display (ELD), a vacuum fluorescent display (VFD), a field emission display (FED), and a liquid crystal display (LCD), it is general to apply an antireflection function in order to prevent decrease in contrast due to reflection of external light on a display surface and reflected glare of an image. An anti-reflection function may be added in some cases for the purpose of improving visibility by increasing transmittance of glass in addition to an image display device, for the purpose of prevention of reflected glare on a dashboard of a windshield of a driving automobile for the purpose of ensuring safety, prevention of reflection on a surface of an in-vehicle camera lens that projects a blind spot of which an installation rate is increasing in recent years, prevention of reflected glare of lighting on a surface or the like of a glass case surrounding a product in a showroom, exhibits at a museum, or the like for protection.

As the method of providing an antireflection function, a method of providing an antireflection layer having a fine uneven shape with a period equal to or less than the wavelength of visible light on the surface of a substrate, that is, an antireflection layer having a so-called moth eye structure is known. The moth eye structure makes a refractive index gradient layer in which the refractive index successively changes in a pseudo manner from the air toward the bulk material inside the substrate, and reflection of the light can be prevented.

JP1993-013021A (JP-H05-013021A) discloses that an antireflection product is manufactured in which ultrafine particles are locked by a $SiO_2$ thin film in which a glass substrate is coated with a coating liquid including tetraethoxysilane and ultrafine particles and baked at a high temperature so as to decompose tetraethoxysilane.

JP2002-234754A discloses a glass article coated with a functional thin film by a sol-gel method.

As an antireflection layer having a moth eye structure, JP2009-139796A discloses the antireflection layer having a moth eye structure manufactured by a method of coating a transparent substrate with a coating liquid containing a transparent resin monomer and a fine particle, curing the coating liquid, forming a transparent resin in which a fine particle is dispersed, and then etching the transparent resin.

SUMMARY OF THE INVENTION

JP1993-013021A (JP-H05-013021A) and JP2002-234754A disclose that the ultrafine particles are exposed at an air interface, and thus easily aggregate, such that reflectance decreases and haze increases. Recently, in view of application in a smart phone, a tablet PC, a showroom glass case surface, and automobile windshield, or the like, in order to obtain visibility under outdoor or very bright environments, further reduction in the reflectance and the haze of the antireflection layer is required.

In the technique of JP2009-139796A, it is required to etch a transparent resin with a high frequency plasma device or the like, and thus the manufacturing process of the antireflection layer becomes complicated. Particularly, a plasma treatment of large glass as in a windshield of automobile or the like causes a device to be expensive and production cost to be high.

An object of the present invention is to provide a laminate that can be used for easily manufacturing an antireflection layer having a satisfactory antireflection performance, low haze, and small muddiness, an antireflection product, a method of manufacturing a laminate, and a method of manufacturing an antireflection product.

In order to solve the above problems, the inventors of the present invention have conducted research on the forming of a moth eye structure by coating a glass substrate with a composition containing particles and a binder compound and causing the binder compound to react for curing. In a case where the particle is exposed to an air interface during the period from coating to curing, the particle easily aggregates, and muddiness is caused in some cases. Meanwhile, in a case where the protrusion amount of the particles from the layer including the binder is small, sufficient antireflection performance may not be obtained in some cases.

As a method of causing the particles to protrude, a method of adjusting a position of the interface of a layer containing a binder compound by causing the binder compound to permeate the substrate is provided. However, in the case of using the glass substrate as the substrate, permeation of the binder compound into the substrate may not be used, and thus the present inventors have conducted research on lamination of another layer on the coating layer including the composition containing particles and a binder compound and the permeation of the binder compound into the other layer. As a result of diligent research by the present inventors, the present inventors have found that, in a case where a layer including a pressure sensitive adhesive is laminated on a coating layer, a state in which the layer including a pressure sensitive adhesive fixes the particles is maintained, and the binder compound permeates the layer including a pressure sensitive adhesive. The present inventors also have found that it is possible to easily manufacture a satisfactory uneven shape formed by particles even on a glass substrate that the binder compound does not permeate by laminating a layer including a pressure sensitive adhesive on a coating layer, causing an interface between the coating layer and the layer including a pressure sensitive adhesive to come close to the glass substrate side, causing the binder compound to react for curing, and removing the layer including a pressure sensitive adhesive. That is, the present inventors have found that the above object can be achieved by the following means.

[1] A laminate comprising: a glass substrate; a layer (ca) including a binder; a particle (a2) having an average primary particle diameter of 100 nm to 380 nm; and a layer (b) including a pressure sensitive adhesive, in which the layer (ca) is present on a side closer to the glass substrate than the layer (b), and the particle (a2) is buried in layers obtained by combining the layer (ca) and the layer (b) and protrudes from an interface of the layer (ca) on a side opposite to an interface of the layer (ca) on the glass substrate side.

[2] The laminate according to [1], further comprising: a support on an interface of the layer (b) on a side opposite to an interface of the layer (b) on the layer (ca) side.

[3] The laminate according to [1] or [2], in which a height of the interface of the layer (ca) on the side opposite to the interface of the layer (ca) on the glass substrate side is equal to or less than a half of an average primary particle diameter of the particles (a2).

[4] The laminate according to any one of [1] to [3], in which a plurality of the particles (a2) are not present in a direction orthogonal to a surface of the glass substrate.

[5] The laminate according to any one of [1] to [4], in which the particle (a2) is a metal oxide particle.

[6] An antireflection product formed by removing the layer (b) including the pressure sensitive adhesive from the laminate according to any one of [1] to [5].

[7] The antireflection product according to [6], in which the antireflection product has an uneven shape formed by the particle (a2) protruding from the interface of the layer (ca) on the side opposite to the interface of the layer (ca) on the glass substrate side, and in the uneven shape, B/A which is the ratio of a distance A between peaks of adjacent protrusions and a distance B between a center between peaks of adjacent protrusions and a recessed part is 0.5 or more.

[8] A method of manufacturing a laminate comprising, in order: a step (1) of providing a binder compound and a particle (a2) having an average primary particle diameter of 100 nm to 380 nm on a glass substrate, in a thickness in which the particle (a2) is buried in a layer (a) including the binder compound;

a step (2) of bonding a layer (b) of a pressure sensitive film having a support and the layer (b) including a pressure sensitive adhesive on the support to the layer (a);

a step (3) of causing a position of an interface between the layer (a) and the layer (b) to come close to the glass substrate side such that the particle (a2) is buried in layers obtained by combining the layer (a) and the layer (b) and protrudes from an interface of the layer (a) on a side opposite to an interface of the layer (a) on the glass substrate side; and a step (4) of curing the layer (a) in a state in which the particle (a2) is buried in the layers obtained by combining the layer (a) and the layer (b).

[9] The method of manufacturing a laminate according to [8], in which the step (3) is performed by causing a portion of the binder compound to permeate the layer (b) including the pressure sensitive adhesive.

[10] A method of manufacturing an antireflection product, comprising: a step (5) of peeling off the pressure sensitive film of a laminate obtained by the method of manufacturing a laminate according to [8] to [9].

According to the present invention, it is possible to provide a laminate that can be used for easily manufacturing an antireflection product having satisfactory antireflection performance, low haze, and small muddiness, an antireflection product, a method of manufacturing a laminate, and a method of manufacturing an antireflection product.

DESCRIPTION OF THE PREFERRED EMBODIMENTS

In the present specification, "(meth)acrylate" refers to at least one of acrylate or methacrylate, "(meth)acryl" refers to at least one of acryl or methacryl, and "(meth)acryloyl" refers to at least one of acryloyl or methacryloyl.

[Method of Manufacturing Laminate]

A method of manufacturing a laminate of the embodiment of the present invention is a method of manufacturing a laminate including, in this order: a step (1) of providing a binder compound and a particle (a2) having an average primary particle diameter of 100 nm to 380 nm on a glass substrate, in a thickness in which the particle (a2) is buried in a layer (a) including the binder compound;

a step (2) of bonding a layer (b) of a pressure sensitive film having a support and the layer (b) including a pressure sensitive adhesive on the support to the layer (a):

a step (3) of causing a position of an interface between the layer (a) and the layer (b) to come close to the glass substrate such that the particle (a2) is buried in layers obtained by combining the layer (a) and the layer (b) and protrudes from an interface of the layer (a) on an opposite side of an interface of the layer (a) on the glass substrate side, and a step (4) of curing the layer (a) in a state in which the particle (a2) is buried in the layers obtained by combining the layer (a) and the layer (b).

The method of manufacturing an antireflection product of the embodiment of the present invention has a step (5) of peeling off the pressure sensitive film of a laminate obtained by a method of manufacturing of a laminate of the embodiment of the present invention.

Figure 1:
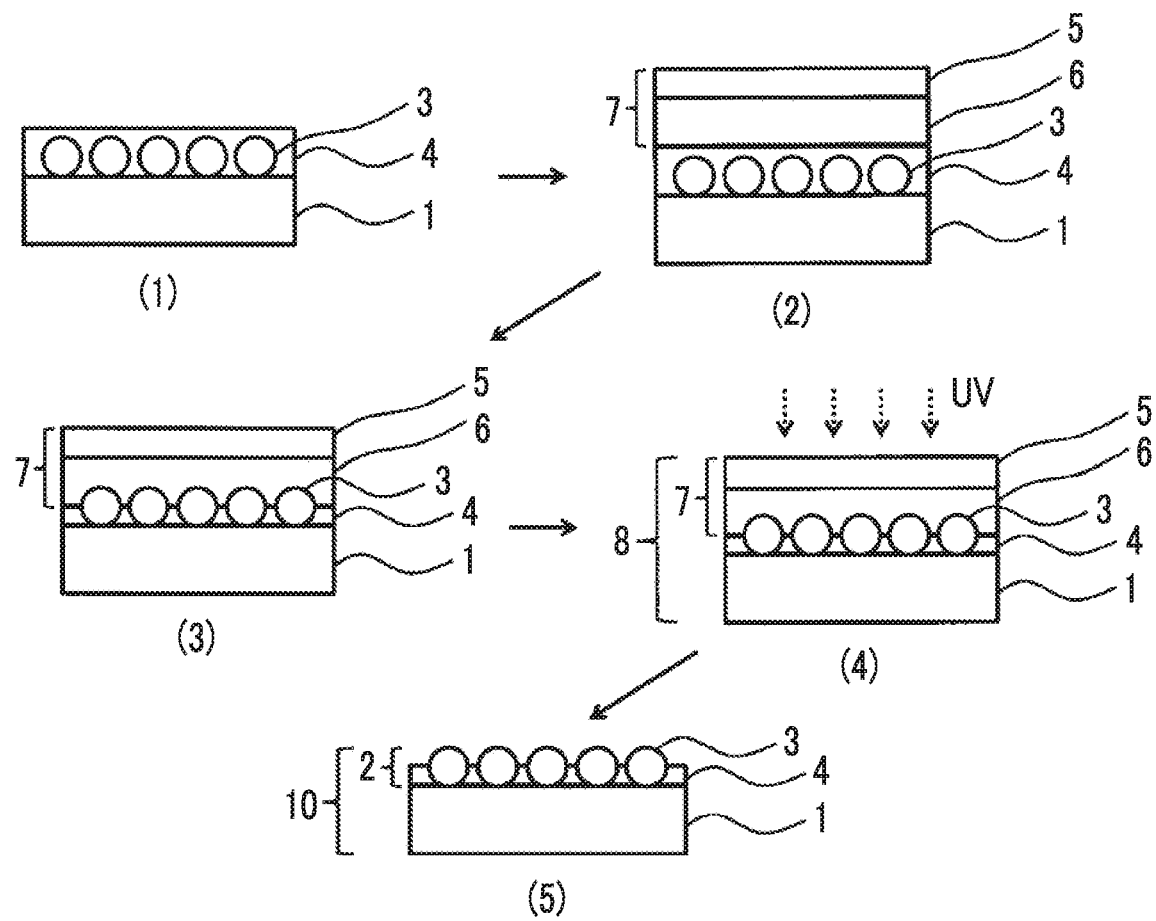
FIG. 1 is a schematic view illustrating an example for describing a method of manufacturing a laminate and a method of manufacturing an antireflection product according to the present invention.

An example of a preferable embodiment of the method of manufacturing the laminate and the method of manufacturing the antireflection product according to the embodiment of the present invention is illustrated in FIG. 1.

(1) of FIG. 1 in the step (1) schematically illustrates a state in which a layer (a) is provided in a thickness that the particle (a2) (reference numeral 3 in FIG. 1) having an average primary particle diameter of 100 nm to 380 nm in the layer (a) (reference numeral 4 in FIG. 1) including the binder compound is buried in a glass substrate 1.

(2) in FIG. 1 schematically illustrates a state in which the layer (b) of the pressure sensitive film 7 having a support 5 and a layer (b) (reference numeral 6 in FIG. 1) including a pressure sensitive adhesive on the support 5 is bonded to the layer (a) (reference numeral 4 in FIG. 1) in the step (2).

(3) of FIG. 1 schematically illustrates a state in which a position of an interface between the layer (a) and the layer (b) is caused to come close (descend) to the glass substrate side, such that the particle (a2) is buried in layers obtained by combining the layer (a) and the layer (b) and protrudes from an interface on an opposite side of the interface of the layer (a) of the layer (a) on the glass substrate, in the step (3). As described below, a method of causing a position of the interface between the layer (a) and the layer (b) to come close to the glass substrate side, a method of causing a portion of the binder compound to permeate the layer (b) is preferable.

(4) of FIG. 1 schematically illustrates a case where the layer (a) is cured in a state in which the particle (a2) is buried in layers obtained by combining the layer (a) and the layer (b) in the step (4).

A laminate 8 obtained completing the step (4) is a laminate of the embodiment of the present invention. The layer (a) (reference numeral 4) in the laminate 8 corresponds to a layer (ca) including a binder formed of a binder compound.

(5) of FIG. 1 illustrates a state (antireflection product 10) after the pressure sensitive film 7 is peeled off in the step (5) of peeling off the pressure sensitive film 7 of the obtained laminate 8 described below.

[Step (1)]

A step (1) is a step of providing a binder compound and a particle (a2) having an average primary particle diameter of 100 nm to 380 nm on a glass substrate, in a thickness in which the particle (a2) is buried in a layer (a) including the binder compound.

According to the present invention, the expression "a thickness in which the particle (a2) is buried in the layer (a)" refers to a thickness of 0.8 times or more of an average primary particle diameter of the particles (a2).

In the step (1), a method of providing the layer (a) on the glass substrate is not particularly limited, but it is preferable to provide the layer (a) by coating the glass substrate with the layer (a). In this case, the layer (a) is a layer obtained by applying a composition (A) including the binder compound and the particle (a2) having an average primary particle diameter of 100 nm to 380 nm. The coating method is not particularly limited, and well-known methods can be used. Examples thereof include a dip coating method, a spin coating method, an air knife coating method, a curtain coating method, a roller coating method, a wire bar coating method, a gravure coating method, and a die coating method.

In the step (1), it is preferable that a plurality of particles (a2) are not present in a direction orthogonal to the surface of the glass substrate. Here, the expression "the plurality of particle (a2) are not present in the direction orthogonal to the surface of the glass substrate" indicates that, in a case where 10 μm×10 μm of the in-plane of the glass substrate is observed with three visual fields with a scanning electron microscope (SEM), the proportion of the number of particles (a2) in a state in which a plurality of the particles are not present in the direction orthogonal to the surface is 80% or more and preferably 95% or more.

(Glass Substrate)

The type of the glass substrate is not particularly limited, and, for example, an inorganic transparent glass sheet of soda lime glass, borosilicate glass, aluminosilicate glass, alkali-free glass, sapphire glass, and the like can be used. Colorless glass such as clear glass or high transmissive glass and glass which is colorated by green or the like such as heat ray absorbing glass can be used together. Various kinds of glass such as low expansion glass, zero expansion glass, low expansion crystallized glass, and zero expansion crystallized glass can be used.

Examples of a form of the glass substrate include a sheet and a film.

The shape of the glass substrate may be a smooth shape formed by a float method, a fusion method, a downdraw method, or the like or may be a shape having unevenness on the surface formed by a roll-out method or the like. The shape may be not only a flat shape but also a shape having a curved surface. In the case where the glass substrate has a curved surface, the entire surface of the glass substrate may be a curved surface, or the surface thereof may include a curved surface portion and a flat surface portion. Examples of the case where the entire surface is a curved surface include a case where a cross section of the glass substrate is arcuate.

The thickness of the glass substrate is not particularly limited. For example, a glass substrate having a thickness of 20 mm or less can be used. It is preferable that the absorption of light can be suppressed low as the thickness is thinner, since the transmittance is improved.

The glass substrate may be tempered glass. Tempered glass is glass subjected to a strengthening treatment. The strengthening treatment improves the strength of the glass, and for example, it is possible to reduce a thickness while the strength is maintained.

However, in the present invention, glass other than tempered glass can also be used, and the glass can be appropriately set according to the application or the like.

As the strengthening treatment, a treatment of forming a compression stress layer on a glass surface is generally known. The compression stress layer on the glass surface improves the strength of the glass against scratches and impacts. As a method of forming a compression stress layer on the glass surface, an air cooling strengthening method (physical strengthening method) and a chemical strengthening method are representative.

In the air cooling strengthening method, the glass surface heated to the vicinity of the softening point of glass (for example, 600° C. to 700° C.) is rapidly cooled by air cooling or the like. As a result, temperatures of the surface and the inside of the glass become different, and thus compression stress occurs on a surface layer of the glass.

In the chemical strengthening method, the glass is immersed in the molten salt at a temperature equal to or lower than the strain point temperature of the glass, and ions (for example, sodium ions) in the glass surface layer are exchanged to ions (for example, potassium ions) with a larger ionic radius. Accordingly, compression stress occurs in the glass surface layer.

In a case where the thickness of the glass substrate becomes thin (for example, 2.5 mm or less, particularly, less than 2 mm), since temperatures of the inside of the glass and the surface layer hardly become different in the air cooling strengthening method, the glass cannot be sufficiently strengthened, and thus a chemical strengthening method is preferably used.

The glass subjected to the chemical strengthening treatment is not particularly limited as long as the glass has a chemical strengthening composition, and various compositions can be used. Examples thereof include soda lime glass, aluminosilicate glass, borate glass, lithium aluminosilicate glass, borosilicate glass, and various other kinds of glass.

The thickness of a glass sheet subjected to the chemical strengthening treatment is preferably 0.1 to 2.5 mm and particularly preferably 0.1 to 2.0 mm. In a case where the sheet thickness is equal to or less than the upper limit of the above range, the antireflection product is lightweighted. In a case where the sheet thickness is equal to or greater than the lower limit of the above range, the strength of the antireflection product is excellent.

There is no change in the sheet thickness before and after the chemical strengthening. That is, the thickness of the glass subjected to the chemical strengthening treatment is a thickness of the chemical tempered glass (a glass sheet after being subjected to the chemical strengthening treatment).

According to the present invention, before the step (1), a functional layer may be provided on the glass substrate. In a case where a functional layer is provided on the glass substrate, a laminate of the functional layer and the glass substrate is called a "glass substrate with a functional layer". In a case where a functional layer is provided on the glass substrate, the layer (a) is provided on the functional layer in the step (1) and subsequent steps are performed.

(Layer (a))

The layer (a) includes the binder compound and the particle (a2) having an average primary particle diameter of 100 nm to 380 nm.

The binder compound is not particularly limited as long as the binder compound is a compound that can form a binder. However, in the present invention, as the binder compound, it is preferable to include at least one of a curable compound (a1) or a compound that forms metal oxide by hydrolysis and/or polycondensation.

The layer (a) is a layer for forming an antireflection layer in the antireflection product (also referred to as a "completed antireflection product") manufactured by the manufacturing method of the embodiment of the present invention.

The binder compound included in the layer (a) may become a binder of the antireflection layer in a completed antireflection product. For example, in a case where the curable compound (a1) is used as the binder compound, the curable compound (a1) cured to form a resin, and the resin becomes a binder resin.

The particle (a2) having an average primary particle diameter of 100 nm to 380 nm which is included in the layer (a) is a particle that protrudes from a surface of a film including a binder in a completed antireflection product and forms an uneven shape (moth eye structure).

The layer (a) is cured in the step (4), and thus components contained before curing and after curing are different, but according to the present invention, for convenience, the layer is referred to as the layer (a) at any stage.

In a case where the binder compound is a compound that forms metal oxide by hydrolysis and/or polycondensation, forming metal oxide (binder) by hydrolysis and/or polycondensation of this compound is referred to as curing, for the sake of convenience.

The film thickness of the layer (a) in the step (1) is preferably 0.8 times to 2.0 times, more preferably 0.8 times to 1.5 times, and even more preferably 0.9 times to 1.2 times of an average primary particle diameter of the particle (a2).

<Binder Compound>

(Curable Compound (a1))

As the binder compound, the curable compound (a1) can be used.

As the curable compound (a1), a compound having a polymerizable functional group (also referred to as "polymerizable group") is preferably used.

As the compound having a polymerizable functional group, various monomers, oligomers, or polymers can be used, and it is preferable to use a compound having a radical or ionic polymerizable group. As the compound having a polymerizable group, a compound having a photopolymerizable functional group such as a polymerizable unsaturated group (carbon-carbon unsaturated double bond group) such as a (meth)acryloyl group, a vinyl group, a styryl group, and an allyl group is preferable, and among these, a compound having a (meth)acryloyl group is preferable.

Specific examples of the compound having a polymerizable unsaturated group include (meth)acrylic acid diesters of alkylene glycol such as neopentyl glycol diacrylate, 1,6-hexanediol di(meth)acrylate, and propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol such as pentaerythritol di(meth)acrylate; and (meth)acrylic acid diesters of an ethylene oxide or propylene oxide adduct such as 2,2-bis{4-(acryloxy.diethoxy)phenyl} propane, and 22-bis{4-(acryloxy.polypropoxy)phenyl} propane.

Epoxy (meth)acrylates, urethane (meth)acrylates, and polyester (meth)acrylates are also preferably used as a polymerizable functional group.

Among these, esters of polyhydric alcohol and (meth)acrylic acid are preferable. More preferably, it contains at least one polyfunctional monomer having three or more (meth)acryloyl groups in one molecule.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphate tri(meth)acrylate, trimethylol ethane tri(meth)acrylate, ditrimethylolpropane tetra(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and caprolactone-modified tris(acryloxyethyl) isocyanurate.

Specific compounds of polyfunctional acrylate-based compounds having (meth)acryloyl groups include esterified products of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420. KAYARAD D-310, KAYARAD DPCA-20, KAYARAD DPCA-30, KAYARAD DPCA-60, and KAYARAD GPO-303 manufactured by Nippon Kayaku Co., Ltd., and V #3PA, V #400, V #36095D, V #1000, and V #1080 manufactured by Osaka Organic Chemical Industry Ltd. A trifunctional or higher functional urethane acrylate compound such as SHIKOH UV-1400B. SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B. SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by Nippon Synthetic Chem Industry Co., Ltd.), UA-306 H, UA-306 I, UA-306 T. and UL-503 LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K. EB-220, EB-5129, EB-1830, and EB-4858 (manufactured by Daicel-UCB Corporation), U-4HA, U-6HA, U-10HA, and U-15HA (manufactured by Shin Nakamura Chemical Co., Ltd.), HIGH-COAP AU-2010 and HIGH-COAP AU-2020 (manufactured by Tokushiki Co., Ltd.), ARONIX M-1960 (manufactured by Toagosei Co., Ltd.), ARTRESIN UN-3320HA, UN-3320HC. UN-3320HS, UN-904, and HDP-4T (manufactured by Negami Chemical Industrial Co., Ltd.), trifunctional or higher functional polyester compounds such as ARONIX M-8100, M-8030, and M-9050 (manufactured by Toagosei Co., Ltd.), and KRM-8307 (manufactured by Daicel-Allnex Ltd.) can be suitably used. Particularly, DPHA and PET-30 are preferably used.

Examples thereof include a resin having three or more polymerizable functional groups, for example, a polyester resin having a relatively low molecular weight, a polyether resin, an acrylic resin, an epoxy resin, an urethane resin, an alkyd resin, a spiroacetal resin, a polybutadiene resin, and a polythiol polyene resin, or an oligomer or a prepolymer of a polyfunctional compound such as polyhydric alcohol.

Compounds disclosed in JP2005-076005A and JP2005-036105A, dendrimers such as SIRIUS-501 and SUBARU-501 (manufactured by Osaka Organic Chemical Industry Ltd.), and norbornene ring-containing monomers disclosed in JP2005-060425A can be used.

In a case where the compound having a polymerizable functional group is used as the curable compound (a1), in order to obtain a strong film by bonding the particle (a2) and the curable compound (a1) to each other, a silane coupling agent having a polymerizable functional group may be used as the curable compound (a1).

Specific examples of a silane coupling agent having a polymerizable functional group include 3-(meth)acryloxypropyltrimethoxysilane, 3-(meth)acryloxypropylmethyldimethoxysilane, 3-(meth)acryloxypropyldimethylmethoxysilane, 3-(meth)acryloxypropylmethyldiethoxysilane, 3-(meth)acryloxypropyl triethoxysilane, 2-(meth)acryloxyethyltrimethoxysilane, 2-(meth)acryloxyethyltriethoxysilane, 4-(meth)acryloxybutyltrimethoxysilane, and 4-(meth)acryloxybutyltriethoxysilane. Specifically. KBM-503 and KBM-5103 (manufactured by Shin-Etsu Chemical Co., Ltd.) or silane coupling agents X-12-1048, X-12-1049, and X-12-1050 (manufactured by Shin-Etsu Chemical Co., Ltd.) disclosed in JP2014-123091A, a compound C3 represented by the following structural formula, and the like can be used.

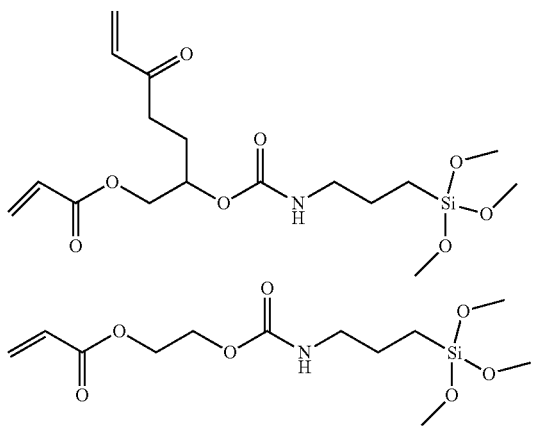

C3

(Compound that Forms Metal Oxide by Hydrolysis and/or Polycondensation)

As the binder compound, a compound (hereinafter, also referred to as a "compound for forming metal oxide") that forms metal oxide by hydrolysis and/or polycondensation can be used.

The compound that forms metal oxide by hydrolysis and/or polycondensation preferably has a hydrolyzable group or a hydroxyl group and is not particularly limited as long as the compound is a compound that is used in a so-called sol gel method. Specifically, various kinds of metal alkoxide, alkoxysilsesquioxane, and the like can be preferably used. Metal oxide formed by hydrolysis and/or polycondensation can be the binder.

As the compound that forms metal oxide by hydrolysis and/or polycondensation, at least one compound selected from a monomer represented by Formula (1), a monomer represented by Formula (2), and a compound obtained by condensation reaction of at least one kind of the two kinds of monomers are preferably used.

$$R^1_{n1}\text{—Si—}X^1_{4-n1}$$ Formula (1):

$$R^2_{n2}\text{—Ti—}X^2_{4-n2}$$ Formula (2):

In Formulae (1) and (2), $R^1$ and $R^2$ each independently represent an alkyl group having 1 to 10 carbon atoms or a hydroxyl group, and may further have a substituent. $X^1$ and $X^2$ each independently represent a hydrolyzable group or a hydroxyl group. n1 and n2 each independently represent 0 or 1. A plurality of $X^1$'s and a plurality of $X^2$'s may be identical to or different from each other. In a case where a plurality of $R^1$'s and $R^2$'s are present, the plurality of $R^1$'s and $R^2$'s may be identical to or different from each other.

Examples of the hydrolyzable group in a case where $X^1$ and $X^2$ represent hydrolyzable groups include an alkoxy group, a halogen atom, and an amino group, and an alkoxy group is preferable.

It is preferable that $R^1$ and $R^2$ preferably represent an alkyl group having 1 to 10 carbon atoms, more preferably an alkyl group having 1 to 5 carbon atoms, and more preferably an alkyl group having 1 to 3 carbon atoms in view of reactivity. These may further have a substituent, and may have an atom other than a carbon atom (for example, a halogen atom, S, N, O, or Si) in a substituent. Examples of the substituent include a functional group such as a halogen atom, a mercapto group, an amino group, a (meth)acryloyl group, or an oxirane ring-containing group.

It is preferable that n1 and n2 are 0.

Specific examples of the monomer represented by Formula (1) include tetraethoxysilane, tetrapropoxysilane, tetrabutoxysilane, methyltrimethoxysilane, methyltriethoxysilane, phenyltriethoxysilane, n-propyltrimethoxysilane, n-propyltriethoxysilane, hexyltrimethoxysilane, hexyltriethoxysilane, methyltrichlorosilane, phenyltrichlorosilane, vinyl trimethoxysilane, vinyl triethoxysilane, 3-glycidoxypropyltrimethoxysilane, 3-glycidoxy octyl trimethoxysilane, 3-methacryloxypropyltrimethoxysilane, 3-methacryloxyoctyl trimethoxysilane, 3-methacryloxypropyltriethoxysilane, 3-acryloxypropyltrimethoxysilane, 3-aminopropyltrimethoxysilane, 3-aminopropyltriethoxysilane, and 3-mercaptopropyltrimethoxysilane.

Specific examples of the monomer represented by Formula (2) include tetraisopropyl titanate, tetra-n-butyl titanate, a butyl titanate dimer, tetraoctyl titanate, tertiary amyl titanate, tetra-tertiary butyl titanate, and tetrastearyl titanate. Examples of commercially available products include ORGATICS TA-10, TA-21, TA-23, TA-30, TA-12, TA-60, TA-80, and TA-90 (all manufactured by Matsumoto Fine Chemical Co., Ltd.) can be preferably used.

The compound including Ti represented by Formula (2) exhibits so-called photocatalytic reaction (oxidation reaction) by photoexcitation and superhydrophilic reaction. The photocatalytic reaction is derived from the oxidation-reduction reaction on a surface of a compound of an electron-hole pair generated by photoexcitation of the Ti compound. Meanwhile, it shows a super-hydrophilization phenomenon in which a water contact angle decreases almost to 0 degree by photoexcitation. It is considered that this is derived from a surface structure change that occurs subsequent to charge separation by photoexcitation. In a case where the binder contains the anatase type titanium oxide compound obtained by condensation reaction of the monomer represented by Formula (2), excellent antifouling performance can be obtained, and, for example, it is particularly suitable for outdoor applications where ultraviolet light is irradiated.

Two or more types of the compounds having a polymerizable functional group may be used in combination. The polymerization of these compounds having a polymerizable functional group can be preferably performed by heating or by irradiation with ionizing radiation or under the presence of a photo-radical initiator.

In view of the dispersion of the particles (a2), it is preferable that the binder compound contains at least one compound having an SP value of 20 to 25. The SP value of the compound is preferably within ±4 and more preferably ±2 with respect to the SP value of the surface of the glass substrate.

The SP value of the glass substrate surface can be appropriately adjusted by a hydrophilization treatment (alkali treatment or the like) on a surface of a glass substrate or a hydrophobization treatment (silane coupling reaction with a silane coupling agent or the like).

The SP value (solubility parameter) in the present invention is a value calculated by the Hoy method, and the Hoy method is disclosed in POLYMER HANDBOOK FOURTH EDITION.

As the binder compound, it is preferable that the layer (a) includes at least one of the curable compound (a1) or the compound for forming metal oxide.

As the binder compound, the layer (a) can further include a binder compound in addition to the curable compound (a1) and the compound for forming metal oxide. Examples of the binder compound in addition to the curable compound (a1) and the compound for forming metal oxide include a compound not having a polymerizable functional group.

In view of permeability into a layer including a pressure sensitive adhesive, as the curable compound (a1), a compound having two or less polymerizable functional groups in one molecule may be used. Particularly, it is preferable that the compound having three or more polymerizable functional groups in one molecule and a compound having two or less polymerizable functional groups in one molecule or a compound not having a polymerizable functional group are used in combination.

The compound having two or less polymerizable functional groups in one molecule or a compound not having a polymerizable functional group is preferably a compound in which a weight-average molecular weight Mwa is 40<Mwa<500. Since the compound includes two or less polymerizable functional groups or does not contain a polymerizable functional group, constriction in a case of curing is small, and stress concentration to the glass substrate can be avoided.

The number of polymerizable functional groups in one molecule of the compound having two or less polymerizable functional groups in one molecule or the compound not having the polymerizable functional group is preferably 0 to 2 and more preferably 0 to 1.

The viscosity of the compound having two or less polymerizable functional groups in one molecule or the compound not having a polymerizable functional group is preferably 100 mPas or less and more preferably 1 to 50 mPas. The compound in this viscosity range is preferable since the compound easily permeates a layer including a pressure sensitive adhesive and also works so as to suppress aggregation of the particle (a2) such that haze and muddiness can be suppressed.

The compound having two or less polymerizable functional groups in one molecule preferably has a (meth) acryloyl group, an epoxy group, an alkoxy group, a vinyl group, a styryl group, and an allyl group as the polymerizable functional group.

As the compound not having a polymerizable functional group, an ester-based compound, an amine-based compound, an ether-based compound, an aliphatic alcohol-based compound, a hydrocarbon-based compound, and the like can be preferably used, and an ester-based compound is particularly preferable. More specific examples thereof include dimethyl succinate (SP value: 20.2, viscosity 2.6 mPas), diethyl succinate (SP value: 19.7, viscosity 2.6 mPas), dimethyl adipate (SP value: 19.7, viscosity 2.8 mPas), dibutyl succinate (SP value: 19.1, viscosity: 3.9 mPas), bis(2-butoxyethyl) adipate (SP value: 19.0, viscosity 10.8 mPas), dimethyl suberate (SP value: 19.4, viscosity: 3.7 mPas), diethyl phthalate (SP value: 22.3, viscosity: 9.8 mPas), dibutyl phthalate (SP value: 21.4, viscosity 13.7 mPas), triethyl citrate (SP value: 22.5, viscosity 22.6 mPas), acetyl triethyl citrate (SP value: 21.1, viscosity 29.7 mPas), and diphenyl ether (SP value: 21.4, viscosity 3.8 mPas).

The weight-average molecular weight and the number-average molecular weight according to the present invention are a value measured in the following conditions by the gel permeation chromatography (GPC).

[Solvent] Tetrahydrofuran
[Device Name] TOSOH HLC-8220GPC
[Column] Three items of TOSOH TSKgel Super HZM-H (4.6 mm×15 cm) are linked to be used.
[Column temperature] 25° C.
[Sample concentration] 0.1 mass %
[Flow rate] 0.35 ml/min
[Calibration Curve] A calibration curve with seven samples of TSK standard polystyrene manufactured by TOSOH Corporation Mw=2,800,000 to 1,050 is used.

The coating amount of the binder compound included in the layer (a) is preferably 100 mg/m$^2$ to 800 mg/m$^2$, more preferably 100 mg/m$^2$ to 600 mg/m$^2$, and most preferably 100 mg/m$^2$ to 400 mg/m$^2$.

<Particle (a2) Having an Average Primary Particle Diameter of 100 nm to 380 nm>

The particle (a2) having an average primary particle diameter of 100 nm to 380 nm is referred to as the "particle (a2)".

Examples of the particle (a2) include a metal oxide particle, a resin particle, and an organic-inorganic hybrid particle having a core of a metal oxide particle and a shell of a resin. In view of excellent film hardness, the metal oxide particle is preferable.

Examples of the metal oxide particle include a silica particle, a titania particle, a zirconia particle, and an antimony pentoxide particle. Since the refractive index is close to many binders, haze is hardly generated and the moth eye structure is easily formed. Therefore, a silica particle is preferable.

Examples of the resin particle include a polymethyl methacrylate particle, a polystyrene particle, and a melamine particle.

In view of forming a moth eye structure by arranging a particle side by side, the average primary particle diameter of the particle (a2) is 100 nm to 380 nm, preferably 100 nm to 300 nm, more preferably 150 nm to 250 nm, and even more preferably 150 nm to 220 nm.

Only one kind of the particle (a2) may be used singly, or two or more kinds of particles having different average primary particle diameters may be used.

The average primary particle diameter of the particle (a2) refers to the cumulative 50% particle diameter of the volume-average particle diameter. A scanning electron microscope (SEM) can be used to measure the particle diameter. A powder particle (in a case of a dispersion liquid, ones obtained by volatilizing a solvent by drying) is observed at the appropriate magnification (about 5000 times) by scanning electron microscope (SEM) observe, the diameter of each of 100 primary particles is measured, the volume thereof is calculated, and the cumulative 50% particle diameter can be taken as the average primary particle diameter. In a case where the particle is not spherical, the average value of the long diameter and the short diameter is regarded as the diameter of the primary particle. In a case where the particles contained in the antireflection product are measured, it is calculated by observing the antireflection product from the front surface side by SEM in the same manner as described above. In this case, for easier observation, carbon vapor deposition, an etching treatment, and the like may be suitably applied to the sample.

A shape of the particle (a2) is most preferably a spherical shape, but may be a shape other than a spherical shape such as an amorphous shape.

In view of the hardness of the particles, the silica particles are preferably crystalline.

As the particle (a2), a surface-treated inorganic fine particle is preferably used for improving the dispersibility in the coating liquid, improving the film hardness, and preventing aggregation. Specific examples and preferable examples of the surface treatment method are the in the same manner those described in [0119] to [0147] of JP2007-298974A.

Particularly, in view of providing the binding performance to the curable compound (a1) which is a binder compound and improving the film hardness, it is preferable that the surface of the particle is surface-modified with a compound having a functional group having reactivity with an unsaturated double bond and the particle surface, and an unsaturated double bond is applied to the particle surface. As the compound used in the surface modification, a silane coupling agent having a polymerizable functional group described above as the curable compound (a1) can be appropriately used.

Specific examples of the particle having an average primary particle diameter of 100 nm to 380 nm include SEAHOSTAR KE-P10 (average primary particle diameter: 100 nm, amorphous silica manufactured by Nippon Shokubai Co., Ltd.), SEAHOSTAR KE-P30 (average primary particle diameter: 300 nm, amorphous silica manufactured by Nippon Shokubai Co., Ltd.), SEAHOSTAR KE-S30 (average primary particle diameter: 300 nm, heat resistance: 1,000° C., calcined silica manufactured by Nippon Shokubai Co., Ltd.), EPOSTAR S (average primary particle diameter: 200 nm, a melamine-formaldehyde condensate manufactured by Nippon Shokubai Co., Ltd.), EPOSTAR MA-MX100W (average primary particle diameter: 175 nm, polymethylmethacrylate (PMMA) crosslinked product manufactured by Nippon Shokubai Co., Ltd.), EPOSTAR MA-MX200W (average primary particle diameter: 350 nm, polymethylmethacrylate (PMMA) crosslinked product manufactured by Nippon Shokubai Co., Ltd.), STAFYROID (multilayer structure organic fine particle manufactured by Aica Kogyo Company, Limited), and GANZPEARL (polymethyl methacrylate, polystyrene particle manufactured by Aica Kogyo Company, Limited) can be preferably used.

Since the amount of hydroxyl groups on the surface is moderately large and the particle is hard, the particle (a2) is particularly preferably a calcined silica particle.

The calcined silica particle can be manufactured by a well-known technique of hydrolyzing and condensing a hydrolyzable silicon compound in an organic solvent including water and a catalyst to obtain a silica particle and calcining the silica particle, and, for example, JP2003-176121A and JP2008-137854A can be referred to.

The silicon compound as a raw material for manufacturing the calcined silica particle is not particularly limited, and examples thereof include a chlorosilane compound such as tetrachlorosilane, methyltrichlorosilane, phenyltrichlorosilane, dimethyldichlorosilane, diphenyldichlorosilane, methyl vinyl dichlorosilane, trimethylchlorosilane, and methyl diphenylchlorosilane: an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino) propyltrimethoxysilane, phenyltrimethoxysilane, phenyltriethoxysilane, dimethyl dimethoxysilane, dimethyl diethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyl triacetoxysilane, phenyl triacetoxysilane, dimethyl diacetoxysilane, diphenyl diacetoxysilane, and trimethylacetoxysilane; and a silanol compound such as dimethylsilanediol, diphenylsilanediol, and trimethylsilanol. Among the exemplary silane compounds, an alkoxysilane compound is particularly preferable, since alkoxysilane compound can be obtained more easily and halogen atoms as impurities in the obtained calcined silica particle are not included. As a preferred embodiment of the calcined silica particle according to the present invention, it is preferable that the content of halogen atoms is substantially 0%, and halogen atoms are not detected.

The calcining temperature is not particularly limited, but is preferably 800° C. to 1,300° C. and more preferably 1,000° C. to 1,200° C.

The coating amount of the particle (a2) is preferably 50 mg/m$^2$ to 200 mg/m$^2$, more preferably 100 mg/m$^2$ to 180 mg/m$^2$, and most preferably 130 mg/m$^2$ to 170 mg/m$^2$. In a case where the coating amount is the lower limit or more, a large number of protrusions of the moth eye structure can be formed, and thus the antireflection performance is more easily improved. In a case where the coating amount is the upper limit or less, aggregation in the liquid hardly occurs and a satisfactory moth eye structure is easily formed.

It is preferable that only one kind of the monodispersed silica fine particle having an average primary particle diameter of 100 nm to 380 nm and having a dispersion degree (CV value) of less than 9% is contained, since the height of the unevenness of the moth eye structure becomes homogeneous and the reflectance is further decreased. The CV value is usually measured using a laser diffraction type particle diameter determination device, but other particle diameter measuring methods may be used, or particle size distribution can be calculated and obtained from the surface SEM image of the antireflection layer in the antireflection product of the embodiment of the present invention by image analysis. The CV value is more preferably less than 8%.

The layer (a) may contain a component in addition to the binder compound and the particle (a2), and examples thereof include a solvent, a polymerization initiator, a dispersing agent of the particle (a2), a leveling agent, and an antifouling agent.

<Solvent>

In view of improving the dispersibility, it is preferable to select a solvent having a polarity close to that of the particle (a2). Specifically, for example, in a case where the particle (a2) is a metal oxide particle, an alcohol-based solvent is preferable, and examples thereof include methanol, ethanol, 2-propanol, 1-propanol, and butanol. For example, in a case where the particle (a2) is a metal resin particle subjected to hydrophobic surface modification, ketone-based, ester-based, carbonate-based, alkane, aromatic, and halogen-based solvents, and the like are preferable, and examples thereof include methyl ethyl ketone (MEK), dimethyl carbonate, methyl acetate, acetone, methylene chloride, and cyclohexanone. A plurality of these solvents may be mixed to be used without remarkably deteriorating the dispersibility.

<Dispersing Agent of Particle (a2)>

The dispersing agent of the particle (a2) lowers the cohesive force between the particles such that the particle (a2) can be easily arranged in a uniform manner. The dispersing agent is not particularly limited, but an anionic compound such as sulfuric acid salt and phosphoric acid salt, a cationic compound such as aliphatic amine salt and quaternary ammonium salt, a nonionic compound, and a polymer compound are preferable, and a polymer compound is more preferable since the polymer compound has a high degree of freedom in selecting adsorptive groups and steric repulsive groups. As the dispersing agent, a commercially available product can be used. Examples thereof include DISPERBYKI61, DISPERBYK162, DISPERBYK163, DISPERBYK164, DISPERBYK166, DISPERBYK167. DISPERBYK 171, DISPERBYK 180, DISPERBYK 182, DISPERBYK2000, DISPERBYK2001, DISPERBYK2164, Bykumen, BYK-2009, BYK-P104, BYK-P104S, BYK-220S, Anti-Terra203, Anti-Terra204, and Anti-Terra205 (all are trade names) manufactured by BYK Japan KK.

<Leveling Agent>

The leveling agent lowers the surface tension of the layer (a), such that the liquid after coating is stabilized and the binder compound and the particle (a2) can be easily arranged in a uniform manner.

A composition for forming the layer (a) used in the present invention can contain at least one leveling agent.

Accordingly, it is possible to suppress film thickness unevenness and the like caused by drying unevenness due to local distribution of drying air, to improve cissing of a coated product, or to easily arrange the binder compound and the particles (a2) in a uniform manner.

As the leveling agent, specifically, at least one leveling agent selected from a silicone-based leveling agent and a fluorine-based leveling agent can be used. The leveling agent is preferably an oligomer or polymer rather than a low molecular compound.

In a case where a leveling agent is added, a leveling agent rapidly moves to the surface of the applied coating film and is unevenly distributed, and thus the leveling agent is unevenly distributed on the surface as it is even after the coating film is dried. Therefore, the surface energy of the film to which the leveling agent is added decreases due to the leveling agent. In view of preventing film thickness unevenness, cissing, and unevenness, it is preferable that the surface energy of the film is low.

Preferable examples of the silicone-based leveling agent include a polymer or an oligomer including a plurality of dimethylsilyloxy units as repeating units and having substituents at a terminal and/or a side chain. A polymer or an oligomer including dimethylsilyloxy as repeating units may include a structural unit in addition to dimethylsilyloxy. The substituent may be identical to or different from each other and it is preferable to include a plurality of substituents. Examples of preferred substituents include groups including a polyether group, an alkyl group, an aryl group, an aryloxy group, a cinnamoyl group, an oxetanyl group, a fluoroalkyl group, a polyoxyalkylene group, or the like.

The number-average molecular weight of the silicone-based leveling agent is not particularly limited, and the number-average molecular weight is preferably 100,000 or less, more preferably 50,000 or less, even more preferably 1,000 to 30,000, and particularly preferably 1,000 to 20,000.

Specific examples of preferable silicone-based leveling agents include X22-3710, X22-162C, X22-3701E, X22160AS, X22170DX. X224015, X22176DX, X22-176F, X224272, KF8001, and X22-2000 manufactured by Shin-Etsu Chemical Co., Ltd.; FM4421, FM0425, FMDA26, FS1265, and the like manufactured by Chisso Corporation: BY16-750, BY16880, BY16848, SF8427, SF8421, SH3746, SH8400, SF3771, SH3749, SH3748, and SH8410 manufactured by Dow Corning Corporation; and TSF series (TSF4460, TSF4440, TSF4445. TSF4450, TSF4446, TSF4453, TSF4452, TSF4730, TSF4770, and the like), FGF502, SILWET series (SILWETL77, SILWETL2780, SILWETL7608, SILWETL7001, SILWETL7002, SILWETL7087, SILWETL7200, SILWETL7210, SILWETL7220, SILWETL7230, SILWETL7500, SILWETL7510, SILWETL7600, SILWETL7602, SILWETL7604, SILWETL7604, SILWETL7605, SILWETL7607, SILWETL7622, SILWETL7644, SILWETL7650, SILWETL7657, SILWETL8500, SILWETL8600, SILWETL8610, SILWETL8620, and SILWETL720) manufactured by Momentive Performance Materials Inc. as commercially available silicone-based leveling agents not having an ionizing radiation curing group, but the present invention is not limited thereto.

Examples of the silicone-based leveling agents having ionizing radiation curing groups include X22-163A, X22-173DX, X22-163C, KFIOI, X22164A, X24-8201, X22174DX, X22164C, X222426, X222445, X222457, X222459, X22245, X221602. X221603, X22164E. X22164B, X22164C, X22164D, and TM0701 manufactured by Shin-Etsu Chemical Co., Ltd., Silaplane series (FM0725, FM0721, FM7725, FM7721, FM7726, FM7727, and the like) manufactured by Chisso Corporation: SF8411, SF8413, BY16-152D, BY16-152, BY16-152C, 8388A, and the like manufactured by Dow Corning Corporation; TEGO-Rad2010, 2011, 2100, 2200N, 2300, 2500, 2600, 2700, and the like manufactured by Evonik Japan Co., Ltd.; BYK3500 manufactured by BYK Japan K.K.; KNS5300 manufactured by Shin-Etsu Chemical Co., Ltd.; and UVHC 1105, UVHC8550, and the like manufactured by Momentive Performance Materials Inc., but the present invention is not limited thereto.

The content of the leveling agent is preferably 0.01 to 5.0 mass %, more preferably 0.01 to 2.0 mass %, and most preferably 0.01 to 1.0 mass % with respect to the total solid content of the composition for forming the layer (a).

The fluorine-based leveling agent is a compound of a fluoroaliphatic group and an amphipathic group that contributes to affinity for various compositions for coating or molding materials, and the like in a case where this leveling agent is used as an additive in the same molecule, and this compound can generally be obtained by copolymerizing a monomer having a fluoroaliphatic group and a monomer having an amphiphathic group.

Representative examples of the monomer having an amphiphathic group copolymerized with a monomer having a fluoroaliphatic group include poly(oxyalkylene) acrylate and poly(oxyalkylene) methacrylate.

As preferable commercially available fluorine-based leveling agents, examples of the leveling agent not having an ionizing radiation curing group include MEGAFACE series (MCF350-5, F472, F476, F445, F444, F443, F178, F470, F475, F479, F477, F482, F486. TF1025, F478, F178K, F-784-F. and the like) manufactured by DIC Corporation; and FTERGENT series (FTX218, 250, 245M, 209F, 222F, 245F, 208G, 218G, 240G, 206D, 240D, and the like) manufactured by NEOS Co., Ltd., and examples of the leveling agent having an ionizing radiation curing group include OPTOOL DAC manufactured by Daikin Industries, Ltd.; and DEFENSA series (TF3001, TF3000, TF3004, TF3028, TF3027, TF3026, TF3025, and the like) and RS series (RS71, RS101, RS102, RS103, RS104, RS105, and the like) manufactured by DIC Corporation, but the present invention is not limited thereto.

Compounds disclosed in JP2004-331812A and JP2004-163610A can be used.

<Antifouling Agent>

For the purpose of providing performance such as antifouling performance, water resistance, chemical resistance, and sliding performance, well-known silicone-based or fluorine-based antifouling agent, lubricant, or the like can be appropriately added to the layer (a).

As the specific examples of the silicone-based or fluorine-based antifouling agent, leveling agents having an ionizing radiation curing group among the silicone-based or fluorine-based leveling agents described above can be appropriately used, but the present invention is not limited thereto.

The content of the antifouling agent is preferably 0.01 to 5.0 mass %, more preferably 0.01 to 2.0 mass %, and most preferably 0.01 to 1.0 mass % with respect to the total solid content of the antifouling agent in the layer (a).

<Polymerization Initiator>

A polymerization initiator may be used in the layer (a).

In a case where the binder compound is a photopolymerizable compound, it is preferable to include a photopolymerization initiator.

Examples of the photopolymerization initiator include acetophenones, benzoins, benzophenones, phosphine oxides, ketals, anthraquinones, thioxanthones, an azo compound, peroxides, 2,3-dialkyldione compounds, disulfide compounds, fluoroamine compounds, aromatic sulfoniums, lophine dimers, onium salts, borate salts, active esters, active halogens, an inorganic complex, and coumarins. Specific examples, preferable embodiments, commercially available products and the like of the photopolymerization initiator are disclosed in paragraphs [0133] to [0151] of JP2009-098658A and can be appropriately used in the present invention in the in the same manner.

Various examples are provided in "Newest UV curing technology" {Technical Information Institute Co. Ltd.} (1991), page 159 and "Ultraviolet Curing System" written by Kiyomi KATO (published in 1989 by The Integrated Technology Center), pages 65 to 148, and are useful in the present invention.

The content of the polymerization initiator in the layer (a) is an amount sufficient for polymerizing the polymerizable compound included in the layer (a) and is preferably 0.1 to 8 mass % and more preferably 0.5 to 5 mass % with respect to the total solid content in the layer (a) such that the starting point does not excessively increase.

For the reaction of the silane coupling agent having a polymerizable functional group described above, a compound that generates an acid or a base by light or heat (hereinafter, sometimes referred to as a photoacid generator, a photobase generator, a thermal acid generator, or a thermal base generator) may be included in the layer (a).

<Photoacid Generator>

Examples of the photoacid generator include onium salt such as diazonium salt, ammonium salt, phosphonium salt, iodonium salt, sulfonium salt, selenonium salt, and an arsonium salt, an organohalogen compound, organometallic/organic halide, a photoacid generator having an o-nitrobenzyl-based protecting group, a compound that is photolyzed to generate sulfonic acid and is represented by iminosulfonate and the like, a disulfone compound, diazoketosulfone, and a diazodisulfone compound. Examples thereof also include triazines (for example, 2-(4-methoxyphenyl)-4,6-bis(trichloromethyl)-1,3,5-triazine, and the like), quaternary ammonium salts, a diazomethane compound, an imide sulfonate compound, and an oxime sulfonate compound.

A group that generates an acid by light or a compound obtained by introducing a compound into a main chain or a side chain of a polymer can be used.

Compounds that generate acid by light which are disclosed in V. N. R. Pillai, Synthesis, (1), 1 (1980), A. Abad et al., Tetrahedron Lett., (47) 4555 (1971), D. H. R. Barton et al., J. Chem. Soc., (C), 329 (1970), U.S. Pat. No. 3,779, 778A, and EP126,712B can be used.

<Thermal Acid Generator>

Examples of the thermal acid generator include salt consisting of an acid and an organic base.

Examples of the acid described above include organic acid such as sulfonic acid, phosphonic acid, and carboxylic acid and inorganic acid such as sulfuric acid and phosphoric acid. In view of compatibility with the binder compound, organic acid is more preferable, sulfonic acid and phosphonic acid are more preferable, and sulfonic acid is most preferable. Preferable examples of sulfonic acid include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH), and nonafluorobutane-1-sulfonic acid (NFBS).

As specific examples of the acid generator, acid generators disclosed in JP2016-000803A can be appropriately used.

<Photobase generator>

Examples of the photobase generator include a substance that generates bases by the action of active energy rays. More specifically, (1) a salt of organic acid and a base which is decomposed by decarburization by irradiation with ultraviolet rays, visible light, or infrared rays. (2) a compound decomposed by intramolecular nucleophilic substitution reaction or rearrangement reaction to emit amines, or (3) a substance which causes some chemical reaction by irradiation with ultraviolet rays, visible light, or infrared rays to emit a base can be used.

The photobase generator used in the present invention is not particularly limited, as long as the photobase generator is a substance that generates a base by the action of active energy rays such as ultraviolet rays, electron beams, X rays, infrared rays, and visible light.

Specifically, photobase generators disclosed in JP2010-243773A can be appropriately used.

The content of the compound that generates an acid or a base by light or heat in the layer (a) is an amount sufficient for polymerizing the polymerizable compound included in the layer (a) and is preferably 0.1 to 8 mass % and more preferably 0.1 to 5 mass % with respect to the total solid content in the layer (a) such that the starting point does not excessively increase.

<Catalyst>

The layer (a) may include a catalyst in order to form metal oxide by hydrolysis and/or polycondensation. Examples of the catalyst include acidic or basic compound, and the catalyst is not particularly limited.

<Metal Chelate Catalyst>

The catalyst for forming metal oxide by hydrolysis and/or polycondensation preferably contains a metal chelate catalyst.

The metal chelate catalyst has a function of increasing bonding force between the particle (a2) and the binder compound.

As the metal chelate catalyst, a metal complex including a metal element selected from Groups 2, 4, 5, and 13 of the periodic table and an oxo or hydroxy oxygen-containing compound selected from β-diketone, ketoester, hydroxy carboxylic acid or an ester thereof, amino alcohol, and an enolic active hydrogen compound is preferable.

Among the constituent metal elements, a Group 2 element such as Mg, Ca, Sr, or Ba, a Group 4 element such as Ti and Zr, a Group 5 element such as V, Nb, or Ta, or a Group 13 element such as Al or Ga is preferable, and each forms a complex with an excellent catalytic effect. Among these, a metal complex obtained from Zr, Al, and Ti is preferable.

Examples of the oxo or hydroxy oxygen-containing compound forming a ligand of a metal complex include β diketone such as acetylacetone (2,4-pentanedione) and 2,4-heptanedione, keto ester such as methyl acetoacetate, ethyl acetoacetate, and butyl acetoacetate, hydroxycarboxylic acid such as lactic acid, methyl lactate, salicylic acid, ethyl salicylate, phenyl salicylate, malic acid, tartaric acid, and methyl tartrate and esters thereof, keto alcohol such as 4-hydroxy-4-methyl-2-pentanone, 4-hydroxy-2-pentanone, 4-hydroxy-4-methyl-2-heptanone, and 4-hydroxy-2-heptanone, amino alcohol such as monoethanolamine, N,N-dimethylethanolamine, N-methyl-monoethanolamine, diethanolamine, and triethanolamine, an enolic active compound such as methylol melamine, methylol urea, methylol acrylamide, and malonic acid diethyl ester, and a compound having a substituent on a methyl group, a methylene group, or carbonyl carbon of acetylacetone (2,4-pentanedione).

The preferable ligand is an acetylacetone derivative, and the acetylacetone derivative refers to a compound having a substituent on a methyl group, a methylene group, or a carbonyl carbon of acetylacetone. The substituent to be substituted on the methyl group of acetylacetone is a linear or branched alkyl group having 1 to 3 carbon atoms, an acyl group, a hydroxyalkyl group, a carboxyalkyl group, an alkoxy group, and an alkoxyalkyl group, a substituent to be substituted on the methylene group of acetylacetone is a carboxyl group, a linear or branched carboxyalkyl group having 1 to 3 carbon atoms, and a hydroxyalkyl group, and a substituent to be substituted on the carbonyl carbon of acetylacetone is an alkyl group having 1 to 3 carbon atoms, and in this case, a hydrogen atom is added to the carbonyl oxygen to form a hydroxyl group.

Specific examples of preferable acetylacetone derivatives include ethyl carbonyl acetone, n-propylcarbonylacetone, i-propylcarbonylacetone, diacetylacetone, 1-acetyl-1-propionyl-acetylacetone, hydroxyethyl carbonyl acetone, hydroxypropyl carbonyl acetone, acetoacetic acid, acetopropionic acid, diacetoacetic acid, 3,3-diacetopropionic acid, 4,4-diacetobutyric acid, carboxyethyl carbonyl acetone, carboxypropyl carbonyl acetone, and diacetone alcohol.

Among these, acetylacetone and diacetylacetone are particularly preferable. The acetylacetone derivative and the metal element complex are mononuclear complexes in which 1 to 4 acetylacetone derivatives are coordinated per metal element, and in a case where the number of coordinatable hands of the metal element is greater than the sum of coordinatable bonding hands of acetylacetone derivatives, ligands commonly used in ordinary complexes such as water molecules, halogen ions, nitro groups, and ammonio groups may be coordinated.

Examples of preferable metal complexes include tris(acetylacetonato) aluminum complex salt, di(acetylacetonato) aluminum-aquo complex salt, mono(acetylacetonato) aluminum-chloro complex salt, di(diacetvlacetonato) aluminum complex salt, ethyl acetoacetate aluminum diisopropylate, aluminum tris(ethyl acetoacetate), cyclic aluminum oxide isopropylate, tris(acetylacetonato) barium complex salt, di(acetylacetonato) titanium complex salt, tris(acetylacetonato) titanium complex salt, di-i-propoxy bis(acetylacetonato) titanium complex salt, zirconium tris(ethyl acetoacetate), and zirconium tris(benzoic acid) complex salt. These are excellent in stability in an aqueous coating liquid and a gelation promotion effect in sol gel reaction in a case of heating and drying. Among them, particularly, ethyl acetoacetate aluminum diisopropylate, aluminum tris(ethyl acetoacetate), di(acetylacetonato) titanium complex salt, and zirconium tris(ethyl acetoacetate) are preferable.

The description of a counter salt of the metal complex is omitted in the present specification, but any kind of the counter salt can be used as long as the counter salt is a water soluble salt which maintains neutrality of electric charge as the complex compound. For example, a salt form for ensuring stoichiometric neutrality such as nitrate salt, halide salt, sulfate salt, and phosphate salt is used.

The behavior of the metal complex in the silica sol gel reaction is specifically described in J. Sol-Gel. Sci. and Tec. 16, 209 (1999).

The metal chelate catalyst is easily obtained as a commercially available product, or can be obtained by a well-known synthesis method, for example, reaction between each metal chloride and alcohol.

The content of the metal chelate catalyst in the antireflection layer is preferably 0.1 mass % to 10 mass %, more preferably 0.5 mass % to 5 mass %, and even more preferably 1 mass % to 3 mass % with respect to the compound that forms metal oxide by hydrolysis and/or polycondensation in the layer (a). In a case where the content thereof is 0.1 mass % or greater, the hardness of the film becomes sufficient, and in a case where the content thereof is 10 mass % or less, the condensation of the binder does not excessively proceed, such that the bonding between the particle (a2) and the binder becomes sufficient and the particle (a2) hardly falls off.

<Water>

The layer (a) may include water for metal oxide by hydrolysis and/or polycondensation and for the compound for forming metal oxide by hydrolysis and/or polycondensation in the layer (a).

[Step (2)]

A step (2) is a step of bonding a layer (b) of a pressure sensitive film having a support and the layer (b) including a pressure sensitive adhesive on the support to the layer (a).

The method of bonding the layer (a) and the layer (b) of the pressure sensitive film is not particularly limited, and well-known methods may be used. Examples thereof include a lamination method.

It is preferable to bond a pressure sensitive film such that the layer (a) and the layer (b) are in contact with each other.

Before the step (2), a step of drying the layer (a) may be provided. The drying temperature of the layer (a) is preferably 20° C. to 60° C. and more preferably 20° C. to 40° C. The drying time is preferably 0.1 to 120 seconds and more preferably 1 to 30 seconds.

According to the present invention, it has been found that the layer (b) of the pressure sensitive film and the layer (a) are bonded to each other in the step (2), the particle (a2) is buried in the layers obtained by combining the layer (a) and the layer (b) in the step (3), the particle (a2) is caused to protrude from an interface of the layer (a) on an opposite side of the interface of the layer (a) on the glass substrate side, the layer (a) is cured in a state in which the particle (a2) is buried in the layers obtained by combining the layer (a) and the layer (b) in the step (4) described below, such that the particle (a2) is not exposed to an air interface of the layer (a) before curing, and aggregation is suppressed, so as to manufacture a satisfactory uneven shape formed by the particle (a2).

In the present invention, the particles (a2) "are buried in the layers obtained by combining the layer (a) and the layer (b), and protrudes from the interface on a side opposite to the interface on the glass substrate side of the layer (a)" means a state in which each particle (a2) is present across the interface (the interface between the layers (a) and (b)) on a side opposite to the interface on the glass substrate side of the layer (a).

It is preferable to manufacture an antireflection product by peeling off the pressure sensitive film after the laminate of the embodiment of the present invention is manufactured.

(Pressure Sensitive Film)

The pressure sensitive film has a support and the layer (b) including a pressure sensitive adhesive.

<Layer (b)>

The layer (b) includes a pressure sensitive adhesive.

It is preferable that the gel fraction of the pressure sensitive adhesive is 95.0% or greater. In a case where the gel fraction is 95% or more, in a case where the pressure sensitive film is peeled off from the laminate of the embodiment of the present invention to manufacture the antireflection product, it is possible to obtain the antireflection product in which a component of the pressure sensitive adhesive hardly remains on a surface of the antireflection product even in a case where washing is not performed, and reflectance is sufficiently low.

The gel fraction of the pressure sensitive adhesive is more preferably in the range of 95.0% to 99.9%, even more preferably in the range of 97.0% to 99.9%, and particularly preferably in the range of 98.0% to 99.9%.

The gel fraction of the pressure sensitive adhesive is a proportion of an insoluble matter after the pressure sensitive adhesive is immersed in tetrahydrofuran (THF) at 25° C. for 12 hours and is obtained from the following formula.

Gel fraction=(mass of insoluble matter of pressure sensitive adhesive in THF)/(total mass of pressure sensitive adhesive)×100(%)

The weight-average molecular weight of the sol component in the pressure sensitive adhesive is preferably 10,000 or less, more preferably 7,000 or less, and most preferably 5,000 or less. By setting the weight-average molecular weight of the sol component within the above range, the component of the pressure sensitive adhesive can be caused to hardly remain on the surface of the antireflection product in a case where the pressure sensitive film is peeled off from the laminate of the embodiment of the present invention to manufacture an antireflection product.

The sol component of the pressure sensitive adhesive represents a dissolution amount in THF after the pressure sensitive adhesive is immersed in tetrahydrofuran (THF) at 25° C. for 12 hours. The weight-average molecular weight can be analyzed by gel permeation chromatography (GPC).

The film thickness of the layer (b) is preferably 0.1 μm to 50 μm, more preferably 1 μm to 30 μm, and even more preferably 1 μm to 20 μm.

The layer (b) is preferably a pressure sensitive adhesive layer having a slight pressure sensitive adhesive strength in which a peeling strength (pressure sensitive adhesive strength) to a surface of an adherend at a peeling rate of 0.3 m/min is about 0.03 to 0.3 N/25 mm, since handleability in a case of peeling off the pressure sensitive film from the layer (a) which is the adherend is excellent.

The pressure sensitive adhesive preferably includes a polymer and more preferably includes a (meth)acrylic polymer. Particularly, a polymer (in a case where two or more kinds of monomers, a copolymer) of at least one monomer of (meth)acrylic acid alkyl ester monomers having an alkyl group of 1 to 18 carbon atoms is preferable. The weight-average molecular weight of the (meth)acrylic polymer is preferably 200,000 to 2,000,000.

Examples of the (meth)acrylic acid alkyl ester monomer in which an alkyl group has 1 to 18 carbon atoms include an alkyl (meth)acrylate monomer such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, cyclopentyl (meth)acrylate, cyclohexyl (meth)acrylate, isomyristyl (meth)acrylate, isocetyl (meth)acrylate, isostearyl (meth)acrylate, myristyl (meth)acrylate, cetyl (meth)acrylate, stearyl (meth)acrylate, tetradecyl (meth)acrylate, pentadecyl (meth)acrylate, hexadecyl (meth)acrylate, heptadecyl (meth)acrylate, and octadecyl (meth)acrylate. The alkyl group of the alkyl (meth)acrylate monomer may be linear, branched or cyclic. Two or more of the monomers may be used in combination.

Preferable examples of the (meth)acrylate monomer having an aliphatic ring include cyclopentyl (meth)acrylate, cyclohexyl (meth)acrylate, cycloheptyl (meth)acrylate, and isobornyl (meth)acrylate. Among these, cyclohexyl (meth)acrylate is particularly preferable.

The (meth)acrylic polymer is a copolymer consisting of at least one of (meth)acrylic acid alkyl ester monomers having an alkyl group of 1 to 18 carbon atoms and at least one of other copolymerizable monomers. In this case, examples of the other copolymerizable monomers include a copolymerizable vinyl monomer containing at least one group selected from a hydroxyl group, a carboxyl group, and an amino group, a copolymerizable vinyl monomer having a vinyl group, and an aromatic monomer.

Examples of the copolymerizable vinyl monomer containing a hydroxyl group include hydroxyl group-containing (meth)acrylate esters such as 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, and 8-hydroxyoctyl (meth)acrylate, and hydroxyl group-containing (meth)acrylamides such as N-hydroxy (meth)acrylamide, N-hydroxymethyl (meth)acrylamide, and N-hydroxyethyl (meth)acrylamide, and the copolymerizable vinyl monomer is preferably at least one selected from the group of these compounds.

It is preferable that the content of the copolymerizable vinyl monomer containing a hydroxyl group is 0.1 to 15 parts by mass with respect to 100 parts by mass of the (meth)acrylic polymer.

Examples of the copolymerizable vinyl monomer containing a carboxyl group include (meth)acrylic acid, itaconic acid, crotonic acid, maleic acid, fumaric acid, carboxyethyl (meth)acrylate, and carboxypentyl (meth)acrylate, and at least one selected from the group of these compounds is preferable.

The content of the copolymerizable vinyl monomer containing a carboxyl group is preferably 0.1 to 2 parts by mass with respect to 100 parts by mass of the (meth)acrylic copolymer.

Examples of the copolymerizable vinyl monomer containing an amino group include monoalkylaminoalkyl (meth)acrylate such as monomethylaminoethyl (meth)acrylate, monoethylaminoethyl (meth)acrylate, monomethylaminopropyl (meth)acrylate, and monoethylaminopropyl (meth)acrylate.

Examples of the aromatic monomer include styrene in addition to aromatic group-containing (meth)acrylate esters such as benzyl (meth)acrylate and phenoxyethyl (meth)acrylate.

Examples of the copolymerizable vinyl monomer other than the above include various vinyl monomers such as acrylamide, acrylonitrile, methyl vinyl ether, ethyl vinyl ether, vinyl acetate, and vinyl chloride.

The pressure sensitive adhesive may include a cured product of a composition (also referred to as a pressure sensitive adhesive composition) for forming the pressure sensitive adhesive.

The pressure sensitive adhesive composition preferably includes the polymer and the crosslinking agent, and may be crosslinked by heat, ultraviolet rays (UV), or the like. The crosslinking agent is preferably one or more crosslinking agents selected from a compound group consisting of a difunctional or higher functional isocyanate-based crosslinking agent, a difunctional or higher functional epoxy-based crosslinking agent, and an aluminum chelate-based crosslinking agent. In a case where a crosslinking agent is used, in order to cause the component of the pressure sensitive adhesive not to remain on the surface of the antireflection product in a case where the pressure sensitive film is peeled off from the laminate of the embodiment of the present invention to manufacture the antireflection product, the content of the crosslinking agent is preferably 0.1 to 15 parts by mass, more preferably 3.5 to 15 parts by mass, and even more preferably 5.1 to 10 parts by mass with respect to 100 parts by mass of the polymer.

The difunctional or higher functional isocyanate compound may be a polyisocyanate compound having at least two isocyanate (NCO) groups in one molecule, and examples thereof include a burette-modified product and an isocyanurate-modified product of diisocyanates (compounds having two NCO groups in one molecule) such as hexamethylene diisocyanate, isophorone diisocyanate, diphenylmethane diisocyanate, tolylene diisocyanate, and xylylene diisocyanate, and an adduct (polyol modified product) with trivalent or higher valent polyols (compounds having at least three OH groups in one molecule) such as trimethylolpropane and glycerin.

A trifunctional or higher functional isocyanate compound is a polyisocyanate compound having at least three or more isocyanate (NCO) groups in one molecule, and at least one or more selected from the compound group consisting of an isocyanurate body of a hexamethylene diisocyanate compound, an isocyanurate body of an isophorone diisocyanate compound, an adduct of hexamethylene diisocyanate compound, an adduct of isophorone diisocyanate compound, a burette body of a hexamethylene diisocyanate compound, and a burette body of an isophorone diisocyanate compound are preferable.

The difunctional or higher functional isocyanate-based crosslinking agent is contained in an amount of preferably 0.01 to 5.0 parts by mass and more preferably 0.02 to 3.0 parts by mass, with respect to 100 parts by mass of the polymer.

The pressure sensitive adhesive composition may contain an antistatic agent in order to provide antistatic performances. The antistatic agent is preferably an ionic compound and more preferably quaternary onium salt.

As the antistatic agent which is a quaternary onium salt, for example, an alkyldimethylbenzyl ammonium salt having an alkyl group having 8 to 18 carbon atoms, a dialkylmethylbenzyl ammonium salt having an alkyl group having 8 to 18 carbon atoms, a trialkylbenzyl ammonium salt having an alkyl group having 8 to 18 carbon atoms, a tetraalkyl ammonium salt having an alkyl group having 8 to 18 carbon atoms, an alkyldimethylbenzyl phosphonium salt having an alkyl group having 8 to 18 carbon atoms, a dialkylmethylbenzyl phosphonium salt having an alkyl group having 8 to 18 carbon atoms, a trialkylbenzyl phosphonium salt having an alkyl group having 8 to 18 carbon atoms, a tetraalkyl phosphonium salt having an alkyl group having 8 to 18 carbon atoms, an alkyl trimethyl ammonium salt having an alkyl group having 14 to 20 carbon atoms, and an alkyldimethyl ethyl ammonium salt having an alkyl group having 14 to 20 carbon atoms can be used. These alkyl groups may be alkenyl groups having an unsaturated bond.

Examples of the alkyl group having 8 to 18 carbon atoms include an octyl group, a nonyl group, a decyl group, a dodecyl group, a tridecyl group, a tetradecyl group, a pentadecyl group, a hexadecyl group, a heptadecyl group, and an octadecyl group. The alkyl group having 8 to 18 carbon atoms may be a mixed alkyl group derived from natural fats and oils. Examples of the alkenyl group having 8 to 18 carbon atoms include an octenyl group, a nonenyl group, a decenyl group, a dodecenyl group, a tridecenyl group, a tetradecenyl group, a pentadecenyl group, a hexadecenyl group, a heptadecenyl group, an octadecenyl group, an oleyl group, and a linoleyl group.

Examples of the alkyl group having 14 to 20 carbon atoms include a tetradecyl group, a pentadecyl group, a hexadecyl group, a heptadecyl group, an octadecyl group, a nonadecyl group, and an icosyl group. The alkyl group having 8 to 18 carbon atoms may be a mixed alkyl group derived from natural fats and oils. Examples of the alkenyl group having 14 to 20 carbon atoms include a tetradecenyl group, a pentadecenyl group, a hexadecenyl group, a heptadecenyl group, an octadecenyl group, an oleyl group, a linoleyl group, a nonadecenyl group, and an icosenyl group.

Examples of a counter anion of the quaternary onium salt include chloride (Cl$^-$), bromide (Br$^-$), methyl sulfate (CH$_3$OSO$_3^-$), ethyl sulfate (C$_2$H$_5$OSO$_3^-$), and paratoluene sulfonate (p-CH$_3$C$_6$H$_4$SO$_3^-$).

Specific examples of the quaternary onium salt include dodecyl dimethyl benzyl ammonium chloride, dodecyl dimethyl benzyl ammonium bromide, tetradecyl dimethyl benzyl ammonium chloride, tetradecyldimethylbenzyl ammonium bromide, hexadecyl dimethyl benzyl ammonium chloride, hexadecyl dimethyl benzyl ammonium bromide, octadecyl dimethyl benzyl ammonium chloride, octadecyldimethylbenzyl ammonium bromide, trioctylbenzylammonium chloride, trioctylbenzylammonium bromide, trioctylbenzylphosphonium chloride, trioctylbenzylphosphonium bromide, tris(decyl)benzylammonium chloride, tris(decyl)benzylammonium bromide, tris(decyl)benzylphosphonium chloride, tris(decyl)benzylphosphonium bromide, tetraoctyl ammonium chloride, tetraoctyl ammonium bromide, tetraoctylphosphonium chloride, tetraoctylphosphonium bromide, tetranonyl ammonium chloride, tetranonyl ammonium bromide, tetranonyl phosphonium chloride, tetranonylphosphonium bromide, tetrakis(decyl) ammonium chloride, tetrakis(decyl)ammonium bromide, tetrakis(decyl)phosphonium chloride, and tetrakis(decyl) phosphonium bromide.

"Tris(decyl)" and "tetrakis (decyl)" mean having 3 or 4 decyl groups which are alkyl groups having 10 carbon atoms and is different from a tridecyl group which is an alkyl group having 13 carbon atoms or a tetradecyl group which is an alkyl group having 14 carbon atoms.

As the antistatic agent, in addition to the above, nonionic, cationic, anionic, and amphoteric surfactants, ionic liquid, alkali metal salt, metal oxide, metal fine particles, a conductive polymer, carbon, a carbon nanotube can be used.

Examples of the nonionic surfactant include polyoxyethylene alkyl ethers, polyoxyethylene alkyl phenyl ethers, sorbitan fatty acid esters, polyoxyethylene sorbitan fatty acid esters, polyoxyethylene fatty acid esters, glycerin fatty acid esters, propylene glycol fatty acid esters, and polyoxyalkylene-modified silicones.

Examples of the anionic surfactant include monoalkyl sulfate, alkyl polyoxyethylene sulfates, alkylbenzenesulfonic acid salts, and monoalkyl phosphates.

Examples of the amphoteric surfactant include alkyldimethylamine oxide and alkylcarboxybetaine.

The ionic liquid is a non-polymeric substance including anions and cations and being liquid at room temperature (for example, 25° C.). Examples of the cation portion include a cyclic amidine ion such as an imidazolium ion, a pyridinium ion, an ammonium ion, a sulfonium ion, and a phosphonium ion. Examples of the anion portion include C$_n$H$_{2n+1}$COO$^-$, C$_n$F$_{2n+1}$COO$^-$, NO$_3^-$, C$_n$F$_{2n+1}$SO$_3^-$, (C$_n$F$_{2n+1}$SO$_2$)$_2$N$^-$, (C$_n$F$_{2n+1}$SO$_2$)$_3$C$^-$, PO$_4^{2-}$, AlCl$_4^-$, Al$_2$Cl$_7^-$, ClO$_4^-$, BF$_4^-$, PF$_6^-$, AsF$_6^-$, and SbF$_6^-$.

Examples of the alkali metal salt include metal salt consisting of lithium, sodium, and potassium. In order to stabilize ionic substances, a compound containing a polyoxyalkylene structure may be added.

The antistatic agent preferably contains 0.1 to 10 parts by mass with respect to 100 parts by mass of the polymer.

The pressure sensitive adhesive composition can further contain a polyether-modified siloxane compound having HLB of 7 to 15 as an antistatic aid.

HLB is a hydrophilic-lipophilic balance (hydrophilic lipophilicity ratio) defined, for example, by Japanese Industrial Standard (JIS) K3211 (surfactant term) and the like.

The pressure sensitive adhesive composition can further contain a crosslinking accelerator. In a case where the crosslinking accelerator is a polyisocyanate compound as a crosslinking agent, the crosslinking accelerator may be a substance, as long as the substance functions as a catalyst for the reaction (crosslinking reaction) between the polymer and the crosslinking agent, and examples thereof include an amine-based compound such as tertiary amine, and an organometallic compound such as a metal chelate compound, an organotin compound, an organic lead compound, and an organozinc compound. According to the present invention, the crosslinking accelerator is preferably a metal chelate compound or an organotin compound.

Examples of the metal chelate compound include metal chelate catalysts described above.

Examples of the organotin compound include dialkyl tin oxide, fatty acid salt of dialkyl tin, and fatty acid salt of stannous tin. A long-chain alkyl tin compound such as a dioctyl tin compound is preferable. Specific examples of the organotin compound include dioctyl tin oxide and dioctyl tin dilaurate.

The content of the crosslinking accelerator is preferably 0.001 to 0.5 parts by mass with respect to 100 parts by mass of the polymer.

<Support>

The support in the pressure sensitive film is described. As the support, a plastic film consisting of a resin having transparency and flexibility is preferably used. Preferable examples of the plastic film for the support include a film consisting of a polyester film such as polyethylene terephthalate, polyethylene naphthalate, polyethylene isophthalate, and polybutylene terephthalate, a (meth)acrylic resin, a polycarbonate resin, a polystyrene type resin, a polyolefin resin, a cyclic polyolefin resin, and a cellulose resin such as cellulose acylate. Here, the (meth)acrylic resin includes a polymer having a lactone ring structure, a polymer having a glutaric anhydride ring structure, and a polymer having a glutarimide ring structure.

Other plastic films can be used as long as the plastic films have required strength and optical suitability. The support may be an unstretched film or may be uniaxially or biaxially stretched. Otherwise, the support may be a plastic film in which an angle of the axis method formed according to the stretching ratio and stretching crystallization is controlled.

As the support, those having ultraviolet permeability are preferable, but the present invention is not particularly limited to the ultraviolet permeability of the support. It is preferable to have ultraviolet permeability in view of manufacturing suitability, since in the step (4), ultraviolet irradiation from the coating layer side can be performed in a case of curing the layer (a).

Specifically, the maximum transmittance of the support at the wavelength of 250 nm to 300 nm is preferably 20% or more, more preferably 40% or more, and most preferably 60% or more. It is preferable that the maximum transmittance at the wavelength of 250 nm to 300 nm is 20% or more, since the layer (a) can be easily cured by being irradiated with ultraviolet rays from the coating layer side.

Specifically, the maximum transmittance of the pressure sensitive film in which the layer (b) is formed on the support at the wavelength of 250 nm to 300 nm is preferably 20% or more, more preferably 40% or more, and most preferably 60% or more.

The film thickness of the support is not particularly limited, but is preferably 10 μm to 100 μm, more preferably 10 μm to 50 μm, and even more preferably 10 μm to 40 μm.

As the pressure sensitive film obtained by forming the layer (b) on the support, a commercially available protective film can be suitably used. Specific examples thereof include AS3-304, AS3-305, AS3-306, AS3-307, AS3-310, AS3-0421, AS3-0520, AS3-0620, LBO-307, NBO-0424. ZBO-0421, S-362, and TFB-4T3-367AS manufactured by Fujimori Kogyo Co., Ltd.

According to the present invention, the layer (a) is cured while a state in which the particle (a2) is buried in the layers obtained by combining the layer (a) and the layer (b) is maintained in the step (4), in the stage before the step (4), it is preferable that the particles (a2) protrude from the interface on the side opposite to the interface on the glass substrate side of the layer (a). Accordingly, in a case where the layer (a) is cured in the step (4) and then the layer (b) is peeled off in the step (5), it is possible to obtain an antireflection product having an uneven shape formed by protrusion of the particle (a2) from the surface (interface on an opposite side of the interface of the glass substrate side) of the layer (a).

In the step before the step (4), in order to cause the particle (a2) to protrude from an interface on an opposite side of the interface of the glass substrate side of the layer (a), in the step (3) described below, it is preferable to cause a portion of the binder compound to permeate the layer (b) including a pressure sensitive adhesive.

According to the present invention, it is possible to include a step (1-2) of curing a portion of the binder compound in the layer (a) between the steps (1) and (2) to obtain the cured compound (a1c).

In a case where a portion of the binder compound is cured in the step (1-2), the particle (a2) is caused to hardly move such that the aggregation of the particle (a2) can be suppressed.

The expression of "curing a portion of the binder compound" represents not curing all of the binder compounds (b) but curing only a portion thereof. By curing a portion of the binder compound in a step (1-2), it is possible to form a satisfactory uneven shape (moth eye structure) in a case where the position of the interface between the layer (a) and the layer (b) is caused to come close (descend) to the glass substrate side such that the particle (a2) protrudes from the interface of the layer (a) on an opposite side of the interface of the layer (a) on the glass substrate side in the step (3).

[Step (3)]

The step (3) is a step of causing the position of the interface between the layer (a) and the layer (b) to come close (descend) to an opposite side of the interface of the layer (a) on the glass substrate side such that the particle (a2) is buried in the layers obtained by combining the layer (a) and the layer (b) and protrudes from the interface of layer (a) on a side opposite to the interface of the layer (a) on the glass substrate side.

According to the present invention, the expression "the particle (a2) is buried in the layers obtained by combining the layer (a) and the layer (b)" indicates that the thickness of the layers obtained by combining the layer (a) and the layer (b) is 0.8 times or more of the average primary particle diameter of the particles (a2).

It is preferable that the step (3) is performed by causing a portion of the binder compound to permeate the layer (b) (pressure sensitive adhesive layer). By causing the binder compound to be absorbed in the pressure sensitive adhesive layer, it is possible to form an uneven shape formed by the particle (a2) even in a case where a glass substrate not having permeability for the binder compound is used.

In step (3), in a case where a portion of the binder compound is caused to permeate a layer (b) including a pressure sensitive adhesive, the laminate having the glass substrate, the layer (a), and the layer (b) is maintained preferably at less than 60° C. and more preferably at 40° C. or less. By maintaining the temperature at 40° C. or less, the viscosity of the binder compound and pressure sensitive adhesive can be maintained to be high, and at the same time, the thermal motion of the particles (a2) can be suppressed, and thus has a high effect of suppressing the decrease of the antireflection performances due to aggregation of the particles (a2) and the increase of the haze or the muddiness. The lower limit of the temperature at which the laminate having the glass substrate, the layer (a), and the layer (b) is maintained is not particularly limited, and may be the room temperature or a temperature lower than the room temperature (25° C.).

[Step (4)]

The step (4) is a step of curing the layer (a) in a state in which the particle (a2) is buried in the layers obtained by combining the layer (a) and the layer (b).

According to the present invention, the expression "a state in which the particle (a2) is buried in the layers obtained by combining the layer (a) and the layer (b)" indicates that the thickness of the layers obtained by combining the layer (a) and the layer (b) is 0.8 times or more of the average primary particle diameter of the particles (a2).

Curing the layer (a) refers to polymerizing the curable compound (a1) included in the layer (a) in a case where the curable compound (a1) is used as the binder compound. Accordingly, it is possible to form a binder in an antireflection layer of a completed antireflection product. In a case where a compound for forming metal oxide by hydrolysis and/or polycondensation is used as a binder compound, the compound forms metal oxide (binder) by hydrolysis and/or polycondensation. In the step (4), since a state in which the particle (a2) is buried in the layers obtained by combining the layer (a) and the layer (b) is maintained, the aggregation of the particle (a2) is suppressed and the moth eye structure can be formed.

In a case where it is considered that the state in which the particle (a2) is buried in the layers obtained by combining the layer (a) and the layer (b) cannot be maintained due to the volatilization of the component of the layer (b) or the layer (a) after the layer (b) is provided or the permeation of the component to the layer (b) including the pressure sensitive adhesive, an operation of thickening the layer (b) in advance or the like can be performed.

As a mechanism of suppressing particle aggregation by maintaining a state in which the particle (a2) is buried in the layers obtained by combining the layer (a) and the layer (b), it is assumed that, it is known that a large attractive force derived from the surface tension called lateral capillary force works in a case where the particle (a2) is exposed to the air interface until the layer (a) is cured, and thus by burying the particle (a2) in the layers obtained by combining the layer (a) and the layer (b), the attractive force can be reduced.

The curing can be performed by irradiation with ionizing radiation or by heating.

The kind of ionizing radiation is not particularly limited, and examples thereof include X-rays, electron beams, ultraviolet rays, visible light, and infrared rays. However, ultraviolet light is widely used. For example, in a case where the coating film is ultraviolet curable, it is preferable that the binder compound of the layer (a) is cured by being irradiated with ultraviolet rays in an irradiation amount of 10 mJ/cm$^2$ to 1.000 mJ/cm$^2$ by an ultraviolet lamp. The irradiation amount is more preferably 50 mJ/cm$^2$ to 1,000 mJ/cm$^2$ and still more preferably 100 mJ/cm$^2$ to 500 mJ/cm$^2$. At the time of irradiation, the energy may be applied at once or can be applied in a divided manner. As the ultraviolet lamp type, a metal halide lamp, a high pressure mercury lamp, or the like is suitably used.

The oxygen concentration in a case of ionizing radiation irradiation is preferably 0 to 1.0 vol %, more preferably 0 to 0.1 vol %, and most preferably 0 to 0.05 vol %. In a case where the oxygen concentration in a case of ionizing radiation irradiation is smaller than 1.0 vol %, curing inhibition is hardly received, and the film becomes strong.

The heating temperature may be suitably determined according to the glass substrate to be used or the material to be used but is preferably 30° C. or higher, more preferably 80° C. or higher, and even more preferably 100° C. or higher. In a case where the heating temperature is 80° C. or higher, the film becomes dense and durability of mechanical strength improves. The heating temperature is preferably equal to or less than a softening point of the glass substrate to be used.

In a case where the glass substrate is a chemical tempered glass sheet, the heating temperature is preferably 80° C. to 450° C. In a case where the glass substrate is a glass sheet that is not chemically reinforced, the heating step can also serve as a physical strengthening (wind cooling strengthening) step of the glass sheet. In the physical strengthening step, the glass sheet is heated to near the softening temperature of the glass. In this case, the heating temperature is typically set to be lower or higher than about 600° C. to 700° C.

In order to secure adhesiveness between the glass substrate and the layer (a), a post heating step may be provided after the step (4). As the temperature of the post heating step is higher, the adhesiveness between the glass substrate and the binder compound is easily improved. The adhesiveness is easily determined in the relationship between a material of the binder compound and the glass substrate and thus is appropriately changed.

The temperature of the post heating step may be appropriately determined according to the glass substrate to be used, the material to be used, or the like, but the temperature is preferably 80° C. or higher and more preferably 80° C. to 100° C. In a case where the temperature is 80° C. or higher, it is possible to sufficiently obtain an effect of improving adhesiveness between the glass substrate and the layer (a), and in a case where the temperature is 100° C. or lower, the mobility of the particle (a2) does not become too high, and the layer (b) is less likely to be softened, such that the particles (a2) hardly aggregate and the increase of the haze is suppressed. Therefore, the temperature is preferable.

The temperature of the post heating step is preferably equal to or less than a softening point temperature of the glass substrate to be used.

The layer (a) may be partially cured (half cured) in the step (4) and may be completely cured (full cured) after the step (5).

In the steps (2) to (4), it is preferable that a plurality of particles (a2) are not present in a direction orthogonal to the surface of the glass substrate.

In steps (2) to (4), the total film thickness of the film thickness of the layer (a) and the film thickness of the layer (b) is preferably more than the average primary particle diameter of the particle (a2).

It is preferable that the total film thickness of the film thickness of the layer (a) and the film thickness of the layer (b) is more than the average primary particle diameter of the particle (a2), since it is possible to cause the particle (a2) to be buried in the layers obtained by combining the layer (a) and the layer (b).

However, since it is possible to obtain a state (moth eye structure) in which the particle (a2) protrudes from the surface of the layer (a) in a case where the pressure sensitive film including the layer (b) in the step (5) described below is peeled off, in the step (4), it is preferable that the film thickness of the layer (a) is smaller than the average primary particle diameter of the particle (a2), and it is more preferable that the film thickness thereof is equal to or less than a half of the average primary particle diameter of the particles (a2).

It is preferable that the film thickness of the layer (a) in the step (4) is adjusted such that the height of the interface on a side opposite to the interface of the layer (ca) on the glass substrate side, which is obtained by curing this is preferably adjusted to be equal to or less than a half of the average primary particle diameter of the particle (a2), and it is more preferable that the film thickness thereof is adjusted such that, in a case where the film cross section of the layer (ca) is observed by a scanning electron microscope (SEM) and the film thicknesses at 100 random points are measured to obtain the average value, the average value becomes 10 nm to 100 nm (more preferably 20 nm to 90 nm and even more preferably 30 nm to 70 nm).

In the present invention, the expression "the height of the interface on a side opposite to the interface of the layer (ca) on the glass substrate side is equal to or less than a half of the average primary particle diameter of the particle (a2)" means that a position of the interface on a side opposite to the interface of the layer (ca) on the glass substrate side is horizontal to the glass substrate surface and the same as the position of the surface that passes through the center of the particle (a2) or is on the glass substrate side than the surface, horizontal to the glass substrate surface, and on the layer (b) side than the surface that passes through the peak on the glass substrate side of the particle (a2).

In the method of manufacturing the laminate of the embodiment of the present invention, the binder compound and the particle (a2) having an average primary particle diameter of 100 nm to 380 nm are formed in a thickness in which the particle (a2) is buried in the layer (a) including the binder compound, on the layer (b) including the pressure sensitive adhesive of the pressure sensitive film having a support and the layer (b) including the pressure sensitive adhesive on the support, and the layer (a) is bonded to the glass substrate, such that the laminate can be manufactured by Steps (3) to (4).

[Method of Manufacturing Antireflection Product]

The method of manufacturing the antireflection product of the embodiment of the present invention has the step (5) of peeling off the pressure sensitive film of the laminate obtained by the method of manufacturing a laminate of the embodiment of the present invention.

In the laminate of the embodiment of the present invention, even in a case where the layer (b) is peeled off, the pressure sensitive adhesive hardly remains on the layer (a) side, the glass substrate and the cured layer (a) are not dissolved and may be washed with a solvent that dissolves the pressure sensitive adhesive.

After the pressure sensitive film including the layer (b) is peeled off by the step (5), it is possible to obtain an antireflection product having a moth eye structure including an uneven shape formed by the particle (a2) on the surface of the layer (a).

[Laminate]

The laminate of the embodiment of the present invention is a laminate having a glass substrate, the layer (ca) including a binder, the particle (a2) having an average primary particle diameter of 100 nm to 380 nm, and the layer (b) including a pressure sensitive adhesive, in which the layer (ca) is present closer to the glass substrate than the layer (b), and the particle (a2) is buried in layers obtained by matching the layer (ca) and the layer (b) and protrudes from an interface on a side opposite to an interface of the layer (ca) on the glass substrate side.

The layer (ca) including a binder corresponds to the layer (a) after the curing of the step (4) in the method of manufacturing the laminate of the embodiment of the present invention.

It is preferable that the laminate of the embodiment of the present invention further has a support on the interface side on the opposite side of the interface of the layer (b) on the layer (ca) side.

In the laminate of the embodiment of the present invention, the height of the interface on a side opposite to the interface of the layer (ca) on the glass substrate side is preferably equal to or less than a half of the average primary particle diameter of the particle (a2).

In the laminate of the embodiment of the present invention, it is preferable that a plurality of the particles (a2) are not present in the direction orthogonal to the surface of the glass substrate.

In addition, descriptions, specific examples, and preferable ranges of respective layers and respective components in the laminate of the embodiment of the present invention are the same as those described in the method of manufacturing the laminate of the embodiment of the present invention.

[Antireflection Product]

The antireflection product of the embodiment of the present invention is an antireflection product formed by removing the layer (b) including the pressure sensitive adhesive from the laminate of the embodiment of the present invention. As the laminate of the embodiment of the present invention, a support is removed together with the layer (b) in a case where the support is provided on an interface side on a side opposite to the interface of the layer (b) on the layer (ca) side.

That is, the antireflection product of the embodiment of the present invention is an antireflection product having a glass substrate, the layer (ca) including a binder, and the particle (a2) having an average primary particle diameter of 100 nm to 380 nm, and the particle (a2) protrudes from a surface on a side opposite to the interface of the layer (ca) on the glass substrate side.

Figure 2:
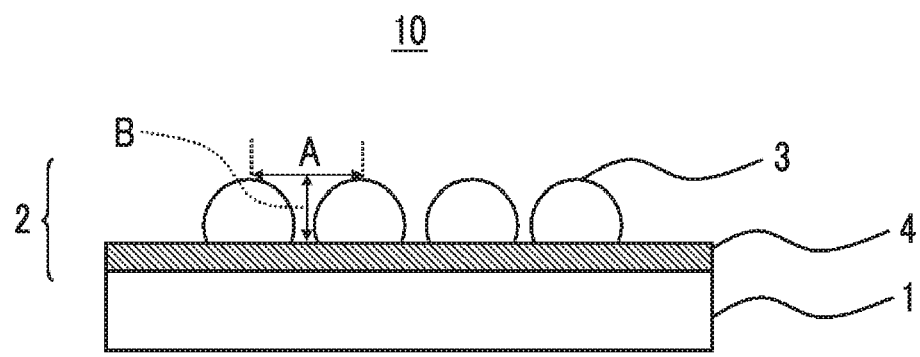
FIG. 2 is a schematic cross sectional view illustrating an example of the antireflection product of the present invention.

An example of a preferable embodiment of the antireflection product that can be obtained by the manufacturing method of the embodiment of the present invention is provided in FIG. 2.

The antireflection product 10 of FIG. 2 has the glass substrate 1 and an antireflection layer 2. The antireflection layer 2 includes the particles (a2) (reference numeral 3) and a film (reference numeral 4) of a binder which is the cured layer (a) (the layer (ca)). The particles 3 protrude from the film 4 of the binder and form a moth eye structure.

(Moth Eye Structure)

The moth eye structure refers to a surface obtained by processing of a substance (material) for suppressing reflection of light and a structure of having a periodic microstructure pattern. Particularly, in a case of having the purpose of suppressing reflection of visible light, the moth eye structure refers to a structure having a microstructure pattern with a period of less than 780 nm. It is preferable that the period of the microstructure pattern is less than 380 nm, the color of reflected light becomes small. It is preferable that the periodicity of the uneven shape of the moth eye structure is 100 nm or more, light having a wavelength of 380 nm can recognize a microstructure pattern and is excellent in antireflection performance. Whether the moth eye structure is present can be checked by observing the surface shape with a scanning electron microscope (scanning electron microscope (SEM)), an atomic force microscope (AFM) or the like, and checking whether the microstructure pattern can be formed.

In the uneven shape of the antireflection layer of the antireflection product of the embodiment of the present invention, it is preferable that B/A which is the ratio of a distance A between the peaks of the adjacent protrusions and a distance B between the center between the peaks of the adjacent protrusions and the recessed part is 0.4 or more. In a case where B/A is 0.4 or more, the refractive index gradient layer in which the depth of the recessed part is greater than the distance between the protrusions and the refractive index gradually changes from the air to the inside of the antireflection layer can be formed, and thus the reflectance can be further reduced.

B/A is more preferably 0.5 or more. In a case where B/A is 0.5 or more, the distance A between the peaks of the adjacent protrusions (protrusions formed by the particles (a2)) becomes the particle diameter or more, such that the recessed part is formed between particles. As a result, it is assumed that, in a case where both of the interface reflection due to a region having a sharp change on the refractive index depending on the curvature of the upper side of the protrusion and the interface reflection due to a region having a sharp change on the refractive index depending on the curvature of the recessed part between the particles are present, in addition to the refractive index gradient layer effect by the moth eye structure, the reflectance is more effectively reduced. B/A can be controlled by the volume ratio of the binder and the particle in the antireflection layer after curing. Therefore, it is important to appropriately design the formulation ratio of the binder and the particle (a2). In a case where the binder permeates a functional layer of the glass substrate with the functional layer in the step of manufacturing the moth eye structure or volatilizes, the volume ratio of the binder and the particle (a2) in the antireflection layer becomes different from the formulation ratio in the composition for forming the antireflection layer, and thus the matching with the functional layer is appropriately set.

In order to realize the low reflectance and suppress the occurrence of haze, it is preferable that the particle (a2) for forming the protrusions is uniformly spread at an appropriate filling rate. In view of the above, the content of the particle (a2) for forming the protrusions is preferably adjusted such that the inorganic particle is uniform over the entire antireflection layer. The filling rate can be measured as the area occupation ratio (particle occupancy ratio) of the particle (a2) located most glass surface side in a case of observing the particle (a2) for forming the protrusions from the surface by scanning electron microscope (SEM) or the like, and is 25% to 64%, preferably 25% to 50%, and more preferably 30% to 45%.

The integrated reflectance of the antireflection product is preferably 1.5% or less, more preferably 1.2% or less, even more preferably 0.9% or less. In a case where the integrated reflectance of the antireflection product is 1.5% or less, the effect of preventing reflection can be sufficiently obtained, and in a case where the integrated reflectance of the antireflection product is 0.9% or less, visibility can be favorably maintained even in a case where the light source is directly reflected.

According to the present invention, with respect to the integrated reflectance of the antireflection product, in a state in which the back side (glass substrate side) of the antireflection product is treated with black ink such that backside reflection was eliminated, an adapter ARV-474 is attached to a spectrophotometer V-550 (manufactured by JASCO Corporation), and the integrated reflectance at an incidence angle of 50 is measured in the wavelength range of 380 to 780 nm, so as to calculate the average reflectance.

The transparency of the antireflection product can be evaluated by haze. With respect to the measurement, a sample of 40 mm×80 mm can be measured according to JIS-K 7136 (2000) with a haze meter NDH 4000 manufactured by Nippon Denshoku Industries Co., Ltd. at 25° C. and a relative humidity of 60%. In a case where a particle aggregated, the haze was high. It is preferable that the haze was lower. The haze value of the antireflection product is preferably 3.0% or less and more preferably 1.2% or less. In a case where the value of the haze of the antireflection product is caused to be 3.0% or less, it is possible to cause the transparency can be satisfactorily maintained without muddiness, and in a case where the value is caused to be 1.2% or less, it is possible to cause the transparency can be satisfactorily maintained without muddiness even in a case of staring at the antireflection product.

[Cover Glass]

The antireflection product of the embodiment of the present invention can be also applied to cover glass.

[Image Display Device]

The antireflection product of the embodiment of the present invention can be also applied to an image display device.

Examples of the image display device include a display device using a cathode ray tube (CRT), a plasma display panel (PDP), an electroluminescent display (ELD), a vacuum fluorescent display (VFD), a field emission display (FED), and a liquid crystal display device (LCD), and a liquid crystal display device is particularly preferable.

Generally, a liquid crystal display device has a liquid crystal cell and two polarizing plates disposed on both sides of the liquid crystal cell, and the liquid crystal cell carries a liquid crystal between the two electrode substrates. One optically anisotropic layer may be arranged between the liquid crystal cell and one polarizing plate, or two optically anisotropic layers may be arranged between the liquid crystal cell and both polarizing plates. As the liquid crystal cell, liquid crystal cells of various driving methods such as a Twisted Nematic (TN) mode, a Vertically Aligned (VA) mode, an Optically Compensatory Bend (OCB) mode, and an In-Plane Switching (IPS) mode can be applied.

[Other Application]

The antireflection product of the embodiment of the present invention is not necessarily limited to an image display device, but it may be a windshield, side glass, or rear glass for automobiles, or may be glass for a railroad vehicle, an aircraft, or a building.

EXAMPLES

Hereinafter, the present invention is specifically described with reference to the examples. A material, a reagent, a substance quantity, a ratio thereof, an operation, and the like provided in the following examples can be suitably changed without departing from the gist of the present invention. Accordingly, the scope of the present invention is not limited to the following specific examples.

[Synthesis of Silica Particle P1] 67.54 kg of methyl alcohol and 26.33 kg of 28 mass % aqueous ammonia (water and catalyst) were introduced to a reactor with capacity of 200 L which is equipped with a stirrer, a dropwise adding device, and a thermometer, and the liquid temperature was adjusted to 33° C. while stirring. On the other hand, a solution prepared by dissolving 12.70 kg of tetramethoxysilane in 5.59 kg of methyl alcohol was introduced to the dropwise adding device. While the liquid temperature in the reactor was maintained to 33° C., the above solution was added dropwise from the dropwise adding device over 44 minutes. After the dropwise addition was completed, stirring was continued while the liquid temperature was maintained to the above temperature for 44 minutes, and hydrolysis and condensation of tetramethoxy silane were performed, so as to obtain a dispersion liquid containing a silica particle precursor. This dispersion liquid was air-dried under the conditions of a heating tube temperature of 175° C. and a reduced pressure degree of 200 torr (27 kPa) by using an instantaneous vacuum evaporator (CRUX SYSTEM CVX-8B model manufactured by Hosokawa Micron Corporation), so as to obtain a silica particle P1.

The average primary particle diameter of the silica particle P1 was 170 nm, the dispersion degree (CV value) of the particle diameter was 7.0%, and the indentation hardness was 340 MPa.

[Manufacturing of Calcined Silica Particle P2]

5 kg of the silica particle P1 were introduced to a crucible, calcined at 900° C. for two hours in an electric furnace, cooled, and then pulverized by using a pulverizer to obtain the calcined silica particle before classification. With respect to the calcined silica particle before classification, disintegration and classification were performed by using a jet pulverizing classifier (IDS-2 model manufactured by Nippon Pneumatic Mfg., Co., Ltd.) to obtain a calcined silica particle P2.

[Manufacturing of Silane Coupling Agent Treated Silica Particle P3]

5 kg of the calcined silica particle P2 was introduced to a Henschel mixer (FM20J model manufactured by Nippon Coke & Engineering Co., Ltd.) having a capacity of 20 L equipped with a heating jacket. A solution obtained by dissolving 45 g of 3-acryloxypropyltrimethoxysilane (KBM-5103 manufactured by Shin-Etsu Chemical Co., Ltd.) in 90 g of methyl alcohol was added dropwise to a portion in which the calcined silica particle P2 was stirred and mixed. Thereafter, the temperature was raised to 150° C. over about one hour while mixing and stirring, and the mixture was maintained at 150° C. for 12 hours, and the heat treatment was performed. Thereafter, in the heat treatment, the attachment on the wall was scraped off while the scraping device was rotated constantly in the opposite direction to the stirring blade. If necessary, the deposits on the wall were scraped off with a spatula. After heating, cooling was performed, and disintegration and classification were performed by using a jet pulverizing classifier, so as to obtain a silane coupling agent treated silica particle P3.

The average primary particle diameter of the silane coupling agent treated silica particle P3 was 171 nm, the dispersion degree (CV value) of the particle diameter was 3.3%, and the indentation hardness was 470 MPa.

[Manufacturing of Silica Particle Dispersion Liquid PA-1]

50 g of the silane coupling agent treated silica particle P3, 200 g of MEK, and 600 g of zirconia beads having a diameter of 0.05 mm were introduced in a 1 L bottle having a diameter of 12 cm, set in a ball mill V-2M (IRIE SHOKAI Co., Ltd.), and dispersed for 10 hours at 250 rotation/min. In this manner, a silica particle dispersion PA-1 (concentration of solid content: 20 mass %) was prepared.

The average primary particle diameter, the CV value, and the indentation hardness of the silica particles included in the silica particle dispersion PA-1 were the same as those in the silane coupling agent treated silica particle P3.

[Synthesis of Compound C3]

19.3 g of 3-isocyanatepropyltrimethoxysilane, 3.9 g of glycerin 1,3-bisacrylate, 6.8 g of 2-hydroxyethyl acrylate, 0.1 g of dibutyltin dilaurate, and 70.0 g of toluene were added to a flask equipped with a reflux condenser and a thermometer and were stirred at room temperature for 12 hours. After stirring, 500 ppm of methylhydroquinone was added, and distillation under reduced pressure was performed, so as to obtain compound C3.

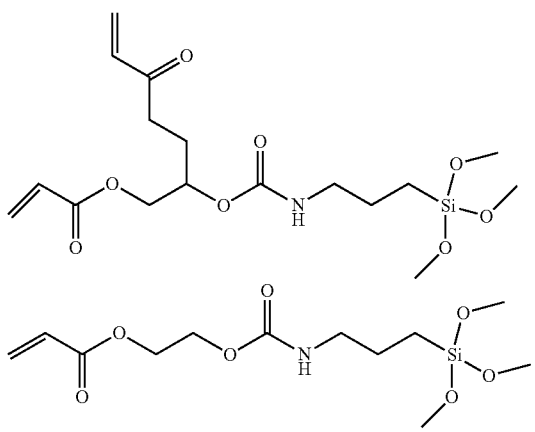

C3

[Preparation of Composition for Forming Layer (a)]

Each component was introduced to a mixing tank so as to have the composition, was stirred for 60 minutes, and was dispersed by an ultrasonic disperser for 30 minutes to obtain a coating liquid.

| Composition (A-1) | |
| --- | --- |
| U-15HA | 1.4 parts by mass |
| Compound C3 | 1.5 parts by mass |
| Acetyl triethyl citrate | 5.8 parts by mass |
| IRGACURE 127 | 0.2 parts by mass |
| Compound P | 0.1 parts by mass |
| Silica particle dispersion liquid PA-1 | 32.3 parts by mass |
| Compound A | 0.1 parts by mass |
| Ethanol | 12.7 parts by mass |

-continued

| Methyl ethyl ketone | 33.3 parts by mass |
| --- | --- |
| Acetone | 12.7 parts by mass |
| Composition (A-2) | |
| U-15HA | 0.47 parts by mass |
| Compound C3 | 0.50 parts by mass |
| Acetyl triethyl citrate | 1.90 parts by mass |
| IRGACURE 127 | 0.07 parts by mass |
| Compound P | 0.03 parts by mass |
| Silica particle dispersion liquid PA-1 | 32.3 parts by mass |
| Compound A | 0.03 parts by mass |
| Ethanol | 14.0 parts by mass |
| Methyl ethyl ketone | 36.7 parts by mass |
| Acetone | 14.0 parts by mass |

U-15HA, Compound C3, and acetyl triethyl citrate are binder compounds, and U-15 HA and Compound C3 are curable compounds (a1). Among them, acetyl triethyl citrate was a compound without a polymerizable functional group.

The compounds used are provided below.

U-15HA (manufactured by Shin Nakamura Chemical Co., Ltd.): Urethane acrylate

IRGACURE 127: Photopolymerization initiator (manufactured by BASF Japan Ltd.)

Compound P: 2-(4-Methoxyphenyl)-4,6-bis(trichloromethyl)-1,3,5-triazine (photoacid generator, manufactured by Tokyo Chemical Industry Co., Ltd.)

Compound A: F-784-F (manufactured by DIC Corporation)

[Glass Substrate]

As the glass substrate, the glass substrate is used.

Chemical tempered glass substrate: Chemical tempered glass manufactured by Matsunami Glass Ind., Ltd., thickness of 0.7 mm, and thickness of chemical tempered layer of 40 μm Sapphire glass: Sapphire single crystal substrate manufactured by Shinkosha Co., Ltd., thickness of 0.7 mm Alkali-free glass: Eagle XG manufactured by Corning Inc., thickness of 1.1 mm Example 1

<Preparation of Antireflection Product 1>

(Step (1): Coating of Layer (a))

2.8 ml/m² of the composition (A-1) was coated on the chemical tempered glass substrate with a gravure coater and was dried at 30° C. for 90 seconds. The film thickness of the layer (a) in the step (1) was as provided in Table 1 below.

(Step (1-2): Step of Curing Portion of Curable Compound (a1) in Layer (a) to Obtain Cured Compound (A1c))

While nitrogen purging was performed so as to be an atmosphere in which an oxygen concentration of 1.5 vol %, irradiation was performed from a surface that is coated with the layer (a) of the glass substrate at an irradiation amount of 5.0 mJ by using a high-pressure mercury lamp (manufactured by Dr. Honle A G, model number: 33351N and Part no.: LAMP-HOZ 200 D24 U 450 E), so as to cure a part of the curable compound (a1). With respect to the measurement of the irradiation amount, HEAD SENSER PD-365 was mounted on an eye ultraviolet ray integrating accumulation light meter UV METER UVPF-A1 manufactured by Eye Graphics, Inc., and the measurement was performed in a measurement range of 0.00.

(Step (2): Bonding of Pressure Sensitive Film)

Subsequently, the pressure sensitive film obtained by peeling off a release film from a protective film (MASTAC TFB AS3-304) manufactured by Fujimori Kogyo Co., Ltd.

was bonded to the layer (a) with nip rollers such that the pressure sensitive adhesive layer (layer (b)) on the layer (a) side.

The protective film herein refers to a laminate formed of the support/the pressure sensitive adhesive layer/the release film, and a laminate obtained by peeling off the release film from the protective film and formed of the support/the pressure sensitive adhesive layer was a pressure sensitive film.

The protective film used is as below.

MASTACK TFB AS3-304 (manufactured by Fujimori Kogyo Co., Ltd., Optical protective film with antistatic function) (hereinafter also referred to as "AS3-304")

Support: Polyester film (thickness: 38 μm)

Thickness of pressure sensitive adhesive layer: 20 μm

Maximum transmittance at wavelength of 250 nm to 300 nm in state in which release film was peeled: Less than 0.1%

The transmittance was measured using a ultraviolet-visible-near infrared spectrophotometer UV3150 manufactured by Shimadzu Corporation.

(Step (3): Permeation of Curable Compound (a1) into Pressure Sensitive Adhesive Layer)

While the pressure sensitive film was bonded, the film was left at 40° C. for 15 minutes such that a portion of the curable compound (a1) permeates the pressure sensitive film.

(Step (4): Curing of Layer (a))

Subsequently to the leaving, irradiation was performed with ultraviolet rays having an illuminance of 200 mW/cm$^2$ and an irradiation amount of 300 mJ/cm$^2$ over the pressure sensitive film from the surface covered with the layer (a) of the glass substrate by using an air cooling metal halide lamp (manufactured by Eye Graphics Co., Ltd.) of 160 W/cm while purging was performed with nitrogen such that the atmosphere had an oxygen concentration of 0.01 vol % glass or less, so as to cure the layer (a).

In this manner, the laminate of Example 1 was manufactured. Thereafter, in order to improve adhesiveness between the glass substrate and the curable compound, the laminate was left at 80° C. for 15 minutes, and post heating was performed.

In the post heating step after the step (4), the film thicknesses of the layer (a) and the pressure sensitive adhesive layer (the layer (b)) before the step (5) was performed were as presented in the column of "Step (4)" of Table 1.

(Step (5): Peeling of Pressure Sensitive Film)

A pressure sensitive film (film obtained by peeling off the release film from MASTACK TFB AS3-304) was peeled off from the prepared laminate of Example 1. The layer (a) after peeling was cured to a degree of not being broken by the peeling of the pressure sensitive adhesive. After the pressure sensitive adhesive was peeled off, the surface covered with the layer (a) of the glass substrate was irradiated with ultraviolet rays having an illuminance of 200 mW/cm$^2$ and an irradiation amount of 300 mJ/cm$^2$ by using an air cooling metal halide lamp (manufactured by Eye Graphics Co., Ltd.) of 160 W/cm while purging was performed with nitrogen such that the atmosphere had an oxygen concentration of 0.01 vol % glass or less, so as to cure the layer (a). Thereafter, the pressure sensitive film (film obtained by peeling off the release film from MASTACK TFB AS3-304) was peeled off, methyl isobutyl ketone was applied to the surface to which the pressure sensitive adhesive film had been bonded so as to wash out the residue of the pressure sensitive film, and drying was performed at 25° C. for 10 minutes, so as to obtain an antireflection product 1.

(Preparation of Protective Film A)

<Synthesis of Acrylic Copolymer 1>

Nitrogen gas was introduced to a reaction device equipped with a stirrer, a thermometer, a reflux condenser, and a nitrogen introduction pipe, such that the air in the reaction device was replaced with nitrogen gas. Thereafter, 70 parts by mass of isooctyl acrylate, 20 parts by mass of isocetyl acrylate, and 10 parts by mass of 4-hydroxybutyl acrylate, and 100 parts by mass of a solvent (ethyl acetate) were added in the reaction device. Thereafter, 0.1 parts by mass of azobisisobutyronitrile as a polymerization initiator was added dropwise over 2 hours, and reaction was performed at 65° C. for eight hours so as to obtain a solution of an acrylic copolymer 1 having a weight-average molecular weight of 700,000, which was obtained by dissolving the acrylic copolymer 1.

<Preparation of Pressure Sensitive Adhesive Composition and Protective Film A>

5.5 parts by mass of CORONATE HL and 0.1 parts by mass of dioctyltin dilaurate were added to the solution of the acrylic copolymer 1 synthesized above (at this point, 100 parts by mass of the acrylic copolymer 1) and were stirred and mixed, so as to obtain a pressure sensitive adhesive composition.

A release film consisting of a silicone resin-coated polyethylene terephthalate (PET) film was coated with this pressure sensitive adhesive composition, and the solvent was removed by drying at 90° C., so as to obtain a laminate in which the thickness of the pressure sensitive adhesive layer was 20 μm.

Thereafter, the pressure sensitive adhesive layer side of the laminate was laminated to a surface opposite to an antistatic and antifouling-treated surface of a polyethylene terephthalate (PET) film (support) which had been subjected to antistatic and antifouling treatment on one side, so as to obtain a protective film A.

Examples 2 to 6 and Comparative Examples 1 and 2

The antireflection products 2 to 6 were prepared in the same manner as the preparation of the antireflection product 1 except that the kind of the composition for forming the layer (a), the glass substrate, the pressure sensitive film, and the heating condition after Step (4) as in Table 1.

As comparative examples, the antireflection products 7 to 8 were manufactured in the same manner as in the antireflection product 1 except that a composition for forming the layer (a) presented in Table 1 was used, a pressure sensitive film was not used in the step (2), heating and post heating were performed in the step (3) in a state in which a pressure sensitive film was not adhered, and peeling of the pressure sensitive film of the step (5) was not performed.

<Gel Fraction of Pressure Sensitive Adhesive>

The pressure sensitive adhesive layer was peeled off from each of the pressure sensitive films, and 0.2 g was weighed (set as a metric value A). 30 g of tetrahydrofuran (THF) was added to this, was stirred for five minutes, and was left for 12 hours. A polytetrafluoroethylene (PTFE) membrane filter having a hole diameter of 10 μm (manufactured by Nippon Millipore) was prepared in advance, and a mass of the filter was measured (set as a metric value B). The THF solution was filtrated by using this filter. The filter after the filtration was dried for two hours at 100° C., and after being left for 30 minutes at 25° C., a mass thereof was measured (set as a metric value C). The gel fraction (insoluble matter to THF) was calculated from the following equation by using each of the metric values.

Gel fraction=100×(C−B)/A

The measurement was performed 3 times, and the average value thereof was used.

(Evaluation of Antireflection Product)

Various properties of the antireflection product were evaluated by the following method. Results thereof are as presented in Tables 1 and 2.

<Integrated Reflectance>

In a state in which the back side (glass substrate side) of the antireflection product was treated with black ink such that backside reflection was eliminated, an adapter ARV-474 was attached to a spectrophotometer V-550 (manufactured by JASCO Corporation), the integrated reflectance at an incidence angle of 5° was measured in the wavelength range of 380 to 780 nm, and the average reflectance was calculated, so as to evaluate the antireflection performance. In a case where there was unevenness of the reflectance in the in-plane, a portion which was visually seen black was measured.

<Haze>

The transparency was evaluated by a haze value. In a case where a particle aggregated, the haze was high. In conformity with JIS-K7136, the total haze value (%) of the obtained antireflection product was measured. A haze meter NDH4000 manufactured by Nippon Denshoku Industries Co., Ltd. was used in the device.

In a case where the haze value was 1.2% or less . . . there was no muddiness, and transparency was excellent.

In a case where the haze value was greater than 1.2% and 3% or less . . . there was slight muddiness, but there was no problem in external appearance.

In a case where the haze value was greater than 3% . . . muddiness was strong, and external appearance was deteriorated.

<Evaluation of Muddiness>

A black polyethylene terephthalate sheet with pressure sensitive adhesive (manufactured by Tomoegawa Paper Co., Ltd.; "Kukkiri-mieru") was laminated on the surface opposite to the side provided with the coating layer (layer (a)) of the glass substrate, so as to manufacture a 30 cm×30 cm of sample in which light reflection on the back side was prevented. This sample was diagonally irradiated on the surface of the sample with a desk lamp equipped with a three-wavelength fluorescent lamp (FL20SS/EX-N/18 (manufactured by Matsushita Electric Industrial Co., Ltd.)), and the muddiness observed at this point was visually evaluated.

A: Muddiness was not visible even though the sample was carefully observed

B: Whiteness was slightly visible in a case where the sample was carefully observed C: Muddiness was slightly visible on the entire film D: Muddiness was strongly visible on the entire film at a glance <B/A, the Number of Particle Steps, Peeling of Coating Layer>

After the antireflection product was scratched with a diamond cutter, a cross section was obtained by breaking along the scratch, carbon deposition was performed on the cross section, and then an etching treatment was carried out for 10 minutes. Twenty visual fields were observed and photographed at 5,000 times with a scanning electron microscope (SEM). In the obtained image, in the interface formed by the air and the sample, the distance A between the peaks of the adjacent protrusions and the distance B between the center between the peaks of the adjacent protrusions and the recessed part are measured at 100 points, and an average value of B/A was measured. Based on the images of the five visual fields randomly extracted from the obtained images, the number of particle steps in the film thickness direction (the number of particles in a direction orthogonal to the glass substrate surface) was observed. In a case where missing particles were observed even in one visual field out of the above five randomly extracted fields, it was determined that the coating layer was peeled off. Peeling of the coating layer was to evaluate the adhesiveness between the glass substrate and the layer (a), and in a case where the coating layer was not peeled off, the adhesiveness between the glass substrate and the layer (a) was excellent.

TABLE 1

| | | Step (1) | | Step (2) Pressure sensitive film | | | Step (3) Permeation to pressure sensitive |
| --- | --- | --- | --- | --- | --- | --- | --- |
| Antireflection product | Glass substrate | Composition for forming layer (a) | Film thickness of layer (a) | Type of protective film | Film thickness of pressure sensitive adhesive layer | Pressure sensitive adhesive Gel fraction | adhesive layer Heating temperature |
| 1 | Chemical tempered glass | A-1 | 190 nm | AS3-304 | 20 μm | 97.9% | 40° C. |
| 2 | Sapphire glass | A-1 | 190 nm | AS3-304 | 20 μm | 97.9% | 40° C. |
| 3 | Alkali-free glass | A-1 | 190 nm | AS3-304 | 20 μm | 97.9% | 40° C. |
| 4 | Chemical tempered glass | A-1 | 190 nm | A | 20 μm | 98.4% | 40° C. |
| 5 | Chemical tempered glass | A-1 | 190 nm | AS3-304 | 20 μm | 97.9% | 40° C. |
| 6 | Chemical tempered glass | A-1 | 190 nm | AS3-304 | 20 μm | 97.9% | 40° C. |
| 7 | Chemical tempered glass | A-1 | 190 nm | — | — | — | 40° C. |
| 8 | Chemical tempered glass | A-2 | 60 nm | — | — | — | 40° C. |

TABLE 1-continued

| Antireflection product | Step (3) Permeation to pressure sensitive adhesive layer Heating time | Step (4) Film thickness of layer (a) | Film thickness of pressure sensitive adhesive layer | Post heating step Heating temperature | Heating time | Step (5) Peeling of pressure sensitive adhesive layer | Remark |
|---|---|---|---|---|---|---|---|
| 1 | 15 minutes | 50 nm | 20 μm | 80° C. | 15 minutes | Peeled | Example 1 |
| 2 | 15 minutes | 50 nm | 20 μm | 80° C. | 15 minutes | Peeled | Example 2 |
| 3 | 15 minutes | 50 nm | 20 μm | 80° C. | 15 minutes | Peeled | Example 3 |
| 4 | 15 minutes | 50 nm | 20 μm | 80° C. | 15 minutes | Peeled | Example 4 |
| 5 | 15 minutes | 60 nm | 20 μm | 60° C. | 15 minutes | Peeled | Example 5 |
| 6 | 15 minutes | 40 nm | 20 μm | 120° C. | 15 minutes | Peeled | Example 6 |
| 7 | 15 minutes | 170 nm | — | 80° C. | 15 minutes | Not Peeled | Comparative Example 1 |
| 8 | 15 minutes | 50 nm | — | 80° C. | 15 minutes | Not Peeled | Comparative Example 2 |

TABLE 2

| Antireflection product | Integrated reflectance | Haze | Muddiness | B/A | Number of particle steps | peeling of coating layer | Remark |
|---|---|---|---|---|---|---|---|
| 1 | 0.7% | 1.1% | A | 0.60 | One step | Not peeled | Example 1 |
| 2 | 0.7% | 1.1% | A | 0.60 | One step | Not peeled | Example 2 |
| 3 | 0.7% | 1.1% | A | 0.60 | One step | Not peeled | Example 3 |
| 4 | 0.8% | 1.2% | A | 0.60 | One step | Not peeled | Example 4 |
| 5 | 0.6% | 0.9% | A | 0.55 | One step | peeled | Example 5 |
| 6 | 1.0% | 1.3% | B | 0.65 | One step | Not peeled | Example 6 |
| 7 | 3.2% | 1.2% | A | 0.05 | One step | Not peeled | Comparative Example 1 |
| 8 | 2.7% | 3.4% | D | 0.40 | One step | Not peeled | Comparative Example 2 |

It has been found that, in the antireflection product prepared by the manufacturing method of the embodiment of the present invention, the integrated reflectance was 1.5% or less, the haze was 3% or less, and muddiness was excellent.

EXPLANATION OF REFERENCES

1: glass substrate
2: antireflection layer
3: particle (a2)
4: layer (a)
5: support
6: layer (b)
7: pressure sensitive film
8: laminate
10: antireflection product
A: distance between peaks of adjacent protrusions
B: distance between the center of peaks of adjacent protrusions and recessed part
UV: ultraviolet rays According to the present invention, it is possible to provide a laminate that can be used for easily manufacturing an antireflection product having satisfactory antireflection performance, low haze, and small muddiness, an antireflection product using the laminate, a method of manufacturing the laminate, and a method of manufacturing the antireflection product by using the method of manufacturing the laminate.

The present invention has been described in detail and with reference to specific embodiments, but it is obvious to those skilled in the art that various changes and modifications can be made without departing from the spirit and scope of the invention.

What is claimed is:

1. A laminate comprising:
   a glass substrate;
   a layer (ca) including a binder;
   a plurality of particles (a2) having an average primary particle diameter of 100 nm to 380 nm; and
   a layer (b) including a pressure sensitive adhesive,
   wherein the layer (ca) is present on a side closer to the glass substrate than the layer (b),
   the plurality of particles (a2) is buried in a layer comprising the layer (ca) and the layer (b) and protrudes from an interface of the layer (ca) on a side opposite to an interface of the layer (ca) on the glass substrate side, and
   the layer (b) contains the binder of the layer (ca), the binder containing a curable compound having three or more polymerizable functional groups in one molecule and at least one of a curable compound having two or less polymerizable functional groups in one molecule or a curable compound not having a polymerizable functional group.

2. The laminate according to claim 1, further comprising:
   a support on an interface of the layer (b) on a side opposite to an interface of the layer (b) on the layer (ca) side.

3. The laminate according to claim 1,
wherein a height of the interface of the layer (ca) on the side opposite to the interface of the layer (ca) on the glass substrate side is equal to or less than a half of an average primary particle diameter of the plurality of particles (a2).

4. The laminate according to claim 1,
wherein the plurality of the particles (a2) are not present in a direction orthogonal to a surface of the glass substrate.

5. The laminate according to claim 1,
wherein the plurality of particles (a2) is a metal oxide particle.

* * * * *